US009614726B2

(12) United States Patent
Farkas et al.

(10) Patent No.: US 9,614,726 B2
(45) Date of Patent: Apr. 4, 2017

(54) METHOD AND SYSTEM FOR DEPLOYING MAXIMALLY REDUNDANT TREES IN A DATA NETWORK

(71) Applicant: Telefonaktiebolaget L M Ericsson (publ), Stockholm (SE)

(72) Inventors: János Farkas, Kecskemét (HU); Gábor Sándor Enyedi, Békéscsaba (HU)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 89 days.

(21) Appl. No.: 14/601,225

(22) Filed: Jan. 20, 2015

(65) Prior Publication Data

US 2015/0207671 A1 Jul. 23, 2015

Related U.S. Application Data

(60) Provisional application No. 61/929,892, filed on Jan. 21, 2014.

(51) Int. Cl.
*H04L 12/24* (2006.01)
*H04L 12/753* (2013.01)
(Continued)

(52) U.S. Cl.
CPC ......... *H04L 41/0816* (2013.01); *H04L 12/28* (2013.01); *H04L 45/128* (2013.01);
(Continued)

(58) Field of Classification Search
CPC .................................................. H04L 41/0816
(Continued)

(56) References Cited

U.S. PATENT DOCUMENTS 8,861,340 B1 * 10/2014 Atlas ...................... H04L 45/28
370/225
8,958,286 B1 * 2/2015 Atlas ...................... H04L 12/18
370/225
(Continued)

OTHER PUBLICATIONS

J. Postel, "User Datagram Protocol," Aug. 28, 1980, 3 pages, RFC: 768.
(Continued)

*Primary Examiner* — Melvin Marcelo
*Assistant Examiner* — Peter G Solinsky
(74) *Attorney, Agent, or Firm* — Nicholson De Vos Webster & Elliott LLP

(57) ABSTRACT

A method and system is disclosed to compute and distribute a generalized almost directed acyclic graph (GADAG). The method includes computing, by a network element, a GADAG for the network, where the GADAG is a graph abstraction of the network, where the plurality of network elements are the vertices of the GADAG and links connecting the plurality of network elements are the directed edges of the GADAG. The method continues with assembling a GADAG descriptor based on the computed GADAG, and distributing the GADAG descriptor to a plurality of network elements, where each of the plurality of network elements utilizes the GADAG descriptor to compute maximally redundant trees for forwarding traffic. The method also includes leveraging layer 2 attributes and features for layer 2 deployments and updating redundant trees upon topology change events such that traffic outage is avoided or minimized.

22 Claims, 18 Drawing Sheets

Mode B: Operations Upon Topology Change

(51) Int. Cl.
| | |
|---|---|
| *H04L 12/28* | (2006.01) |
| *H04L 12/735* | (2013.01) |
| *H04L 12/715* | (2013.01) |
| *H04L 12/751* | (2013.01) |
| *H04L 12/703* | (2013.01) |
| *H04L 12/717* | (2013.01) |

(52) U.S. Cl.
CPC .............. *H04L 45/48* (2013.01); *H04L 41/12* (2013.01); *H04L 45/02* (2013.01); *H04L 45/28* (2013.01); *H04L 45/42* (2013.01); *H04L 45/64* (2013.01)

(58) Field of Classification Search
USPC .......................................................... 370/228
See application file for complete search history.

(56) References Cited

U.S. PATENT DOCUMENTS

| | | | | |
|---|---|---|---|---|
| 9,100,328 | B1* | 8/2015 | Atlas | ........................ H04L 45/28 |
| 9,270,426 | B1* | 2/2016 | Atlas | .................. H04W 72/0466 |
| 2010/0128603 | A1* | 5/2010 | Kulkarni | .................. H04L 45/00 |
| | | | | 370/228 |
| 2013/0329601 | A1* | 12/2013 | Yin | .......................... H04L 45/02 |
| | | | | 370/254 |

OTHER PUBLICATIONS

"Transmission Control Protocol, DARPA Internet Program Protocol Specification," Sep. 1981, 91 pages, RFC: 793, Information Sciences Institute, University of Southern California, Marina del Rey, California.
C. Hedrick, "Routing Information Protocol," Jun. 1988, 33 pages, Network Working Group, Request for Comments: 1058.
David Oran, "OSI IS-IS Intra-domain Routing Protocol," Feb. 1990, 157 pages, Network Working Group, Request for Comments: 1142.
T. Socolofsky, et al., "A TCP/IP Tutorial," Jan. 1991, 28 pages, Network Working Group, Request for Comments: 1180.
G. Malkin, et al., "RIPng for IPv6," Jan. 1997, 19 pages, Network Working Group, Request for Comments: 2080.
R. Braden, et al., "Resource ReSerVation Protocol (RSVP)—Version 1 Functional Specification," Sep. 1997, 112 pages, Network Working Group, Request for Comments: 2205.
J. Wroclawski, "The Use of RSVP with IETF Integrated Services," Sep. 1997, 33 pages, Network Working Group, Request for Comments: 2210.
J. Wroclawski, "Specification of the Controlled-Load Network Element Service," Sep. 1997, 19 pages, Network Working Group, Request for Comments: 2211.
S. Shenker, et al., "Specification of Guaranteed Quality of Service," Sep. 1997, 20 pages, Network Working Group, Request for Comments: 2212.
J. Moy, "OSPF Version 2," Apr. 1998, 244 pages, Network Working Group, Request for Comments: 2328, The Internet Society.
G. Malkin, "RIP Version 2," Nov. 1998, 39 pages, Network Working Group, Request for Comments: 2453, The Internet Society.
S. Deering, et al., "Internet Protocol, Version 6 (IPv6) Specification," Dec. 1998, 39 pages, Network Working Group, Request for Comments: 2460, The Internet Society.
K. Nichols, et al., "Definition of the Differentiated Services Field (DS Field) in the IPv4 and IPv6 Headers," Dec. 1998, 20 pages, Network Working Group, Request for Comments: 2474, The Internet Society.
S. Blake, et al., "An Architecture for Differentiated Services," Dec. 1998, 36 pages, Network Working Group, Request for Comments: 2475, The Internet Society.
J. Heinanen, et al., "Assured Forwarding PHB Group," Jun. 1999, 11 pages, Network Working Group, Request for Comments: 2597, The Internet Society.

D. Borman, et al., "IPv6 Jumbograms," Aug. 1999, 9 pages, Network Working Group, Request for Comments: 2675, The Internet Society.
D. Black, "Differentiated Services and Tunnels," Oct. 2000, 14 pages, Network Working Group, Request for Comments: 2983, The Internet Society.
K. Nichols, et al., "Definition of Differentiated Services Per Domain Behaviors and Rules for their Specification," Apr. 2001, 24 pages, Network Working Group, Request for Comments: 3086, The Internet Society.
D. Black, et al., "Per Hop Behavior Identification Codes," Jun. 2001, 8 pages, Network Working Group, Request for Comments: 3140, The Internet Society.
D. Awduche, et al., "RSVP-TE: Extensions to RSVP for LSP Tunnels," Dec. 2001, 61 pages, Network Working Group, Request for Comments: 3209, The Internet Society.
B. Davie, et al., "An Expedited Forwarding PHB (Per-Hop Behavior)," Mar. 2002, 16 pages, Network Working Group, Request for Comments: 3246, The Internet Society.
A. Charny, et al., "Supplemental Information for the New Definition of the EF PHB (Expedited Forwarding Per-Hop Behavior)," Mar. 2002, 24 pages, Network Working Group, Request for Comments: 3247, The Internet Society.
D. Grossman, "New Terminology and Clarifications for Diffserv," Apr. 2002, 10 pages, Network Working Group, Request for Comments: 3260, The Internet Society.
F. Baker, et al., "Management Information Base for the Differentiated Services Architecture," May 2002, 116 pages, Network Working Group, Request for Comments: 3289, The Internet Society.
Y. Bernet, et al., "An Informal Management Model for Diffsery Routers," May 2002, 56 pages, Network Working Group, Request for Comments: 3290, The Internet Society.
K. Chan, et al., "Differentiated Services Quality of Service Policy Information Base," Mar. 2003, 96 pages, Network Working Group, Request for Comments: 3317, The Internet Society.
L. Berger, "Generalized Multi-Protocol Label Switching (GMPLS) Signaling Resource ReserVation Protocol-Traffic Engineering (RSVP-TE) Extensions," Jan. 2003, 42 pages, Network Working Group, Request for Comments: 3473, The Internet Society.
K. Kompella, et al., "Procedures for Modifying the Resource reSerVation Protocol (RSVP)," Oct. 2004, 7 pages, Network Working Group, Request for Comments: 3936, The Internet Society.
B. Fenner, et al., "Management Information Base for the User Datagram Protocol (UDP)," Jun. 2005, 19 pages, Network Working Group, Request for Comments: 4113, The Internet Society.
Y. Rekhter, et al., "A Border Gateway Protocol 4 (BGP-4)," Jan. 2006, 104 pages, Network Working Group, Request for Comments: 4271, The Internet Society.
S. Kent, et al., "Security Architecture for the Internet Protocol," Dec. 2005, 101 pages, Network Working Group, Request for Comments: 4301, The Internet Society.
R. Housley, et al., "Using Advanced Encryption Standard (AES) CCM Mode with IPsec Encapsulating Security Payload (ESP)," Dec. 2005, 13 pages, Network Working Group, Request for Comments: 4309, The Internet Society.
J. Polk, et al., "A Resource Reservation Protocol (RSVP) Extension for the Reduction of Bandwidth of a Reservation Flow," May 2006, 21 pages, Network Working Group, Request for Comments: 4495, The Internet Society.
Z. Ali, et al., "Node-ID Based Resource Reservation Protocol (RSVP) Hello: A Clarification Statement," Jun. 2006, 7 pages, Network Working Group, Request for Comments: 4558, The Internet Society.
J. Babiarz, et al., "Configuration Guidelines for DiffServ Service Classes," Aug. 2006, 57 pages, Network Working Group, Request for Comments: 4594, The Internet Society.
L. Andersson, et al., "LDP Specification," Oct. 2007, 135 pages, Network Working Group, Request for Comments: 5036, The IETF Trust.

(56) References Cited

OTHER PUBLICATIONS

R. Coltun, et al., "OSPF for IPv6," Jul. 2008, 94 pages, Network Working Group, Request for Comments: 5340, The IETF Trust.

L. Eggert, et al., "Unicast UDP Usage Guidelines for Application Designers," Nov. 2008, 27 pages, Network Working Group, Request for Comments: 5405, IETF Trust and the persons identified as the document authors.

F. Baker, et al., "A Differentiated Services Code Point (DSCP) for Capacity-Admitted Traffic," May 2010, 14 pages, Internet Engineering Task Force (IETF), Request for Comments: 5865, IETF Trust and the persons identified as the document authors.

"IEEE P802.1Qca/D0.5—Draft Standard for Local and metropolitan area networks—Bridges and Bridged Networks—Amendment: Path Control and Reservation," Dec. 19, 2013, 54 pages, Institute of Electrical and Electronics Engineers, Inc., New York, New York.

A. Atlas, Ed. et al., "An Architecture for IP/LDP Fast-Reroute Using Maximally Redundant Trees," Routing Area Working Group, MRT Unicast FRR Architecture, Jul. 12, 2013, pp. 1-29.

G. Enyedi, Ed. et al., "Algorithms for computing Maximally Redundant Trees for IP/LDP Fast—Reroute," Routing Area Working Group, MT FRR Algorithm, Oct. 21, 2013, pp. 1-56.

Li, Z. et al., "Intermediate System to Intermediate System (IS-IS) Extensions for Maximally Redundant Trees (MRT)," Network Working Group, IS-IS Extensions for MRT, Oct. 18, 2013, 13 pages.

International Search Report and Written Opinion for Application No. PCT/SE2015/050054, mailed Apr. 17, 2015, 13 pages.

A. Atlas et al., "Algorithms for computing Maximally Redundant Trees for IP/LDP Fast-Reroute; draft-enyedi-rtgwg-mrt-frr-algorithm-01", Routing Area Working Group, Internet-Draft, Mar. 12, 2012, pp. 1-46.

J. Farakas et al., "802.1Qca—PCR A Proposal", Jan. 15, 2013, Retrieved from the Internet: URL:http://www.ieee802.org/a/files/public/docs2013/ca-farkas-proposal-0113-v01.pdf, retrieved on Oct. 14, 2014, 1-27 pages.

"IEEE 802.1aq—Wikipedia", Dec. 28, 2013, Retrieved from the Internet: URL:https://web.archive.org/web/20131228202511/http://en.wikipedia.org/wiki/IEEE_802.1aq, retrieved on Apr. 10, 2015, pp. 1-13.

\* cited by examiner

GADAG Root = A
MRT Root = A

MRT-Red: Packet Follows Descending GADAG Order

GADAG Root = A
MRT Root = A

MRT-Blue: Packet Follows Ascending GADAG Order

MRT-Red: Packet Follows Descending GADAG Order

MRT-Blue: Packet Follows Ascending GADAG Order

| ECT Algorithm | Algorithm Mode |
|---|---|
| 00-80-C2-20 | Centrally Computed MRT (Mode C) |
| 00-80-C2-21 | Fully distributed Computation (Mode A) |
| ... | ... |
| 00-80-C2-23 | Centrally Computed GADAG (Mode B) |
| ... | ... |

ECT Algorithm Mapping

FIG. 7

Mode A: Operations Upon Topology Change

Mode A: Operations Upon Topology Change

METHOD AND SYSTEM FOR DEPLOYING MAXIMALLY REDUNDANT TREES IN A DATA NETWORK

CROSS-REFERENCE TO RELATED APPLICATION

This application claims priority to U.S. Provisional Patent Application No. 61/929,892, filed on Jan. 21, 2014.

FIELD OF INVENTION

The embodiments of the invention are related to the field of networking. More specifically, the embodiments of the invention relate to a method and system for deploying maximally redundant trees (MRTs) in a data network.

BACKGROUND

In a data network, the forwarding paths are typically controlled by a path control protocol, which provides the path for a frame/packet to be forwarded. In order to improve the robustness of the data network, it is desirable to build redundancy in path selection, i.e., at a given node, if one path fails, another path can be used to route traffic. It is desirable that such redundancy is predetermined thus in case of topology change, the node may immediately switch path. One way to computing redundant paths is to view a network connection as a graph, and find maximally redundant trees (MRTs) in the graph.

Some solutions have been proposed in implementing maximally redundant trees at Internet Protocol (IP) layer (Layer 3, or L3). For example, an IETF Draft, dated Jul. 12, 2013, entitled "An Architecture for IP/LDP Fast-Reroute Using Maximally Redundant Trees," discloses a method to gives link-protection and node protection in any network topology that is still connected after a link/node failure. Another IETF draft, dated Oct. 18, 2013, entitled "Intermediate System to Intermediate System (IS-IS) Extensions for Maximally Redundant Trees," discloses an extension of IS-IS protocol to support distributed computation of MRTs. Yet, we know no solution proposed in implementing maximally redundant trees at OSI Layer 2 (data link layer) (referred to as L2). Also, the known Layer 3 solutions do not address distribution of computation of maximally redundant trees. It is desirable to make Layer 3 MRT solution more efficient and have a layer 2 MRT solution.

SUMMARY

A method is proposed to compute and distribute a generalized almost directed acyclic graph (GADAG) implemented in a network element implementing functionalities of a path computation element (PCE) of a network containing a plurality of network elements, where the network element computes the GADAG, and it assembles a GADAG descriptor and sends out the GADAG descriptor. The method may be performed at either layer 2 or layer 3 networks. The PCE may reside in a network element or in a host, e.g. as part of an SDN Controller.

The method includes computing, by the network element implementing functionalities of the PCE, a GADAG for the network, where the GADAG is a graph abstraction of the network, where the plurality of network elements are the vertices of the GADAG and links connecting the plurality of network elements are the directed edges of the GADAG. The method continues with assembling a GADAG descriptor based on the computed GADAG, and distributing the GADAG descriptor to the plurality of network elements, where each of the plurality of network elements utilizes the GADAG descriptor to compute maximally redundant trees for forwarding traffic.

A network element is also disclosed for computing and distributing a GADAG. The network element serves as the PCE of a network containing a plurality of network elements. The network element computes the GADAG for the network, where the GADAG is a graph abstraction of the network, wherein the plurality of network elements are the vertices of the GADAG and links connecting the plurality of network elements are the directed edges of the GADAG. The network element assembles a GADAG descriptor based on the computed GADAG and distributes the GADAG descriptor to the plurality of network elements, wherein each of the plurality of network elements utilizes the GADAG descriptor to compute maximally redundant trees for forwarding traffic.

Non-transitory machine-readable storage media have instructions stored to perform the method is also proposed.

Embodiments of the disclosed methods propose ways to deploy maximally redundant trees (MRTs) at Layer 2 and allow the deploying of MRTs more efficiently at Layer 3. Embodiments of the disclosed methods also provide ways for updating redundant trees after topology changes.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this specification are not necessarily to the same embodiment, and such references mean at least one. Further, when a particular feature, structure, or characteristic is described in connection with an embodiment, it is submitted that it is within the knowledge of one skilled in the art to affect such feature, structure, or characteristic in connection with other embodiments whether or not explicitly described.

FIG. 7 is a block diagram illustrating an equal cost tree (ECT) algorithm mapping according to one embodiment of the invention.

DETAILED DESCRIPTION

Figure 1:
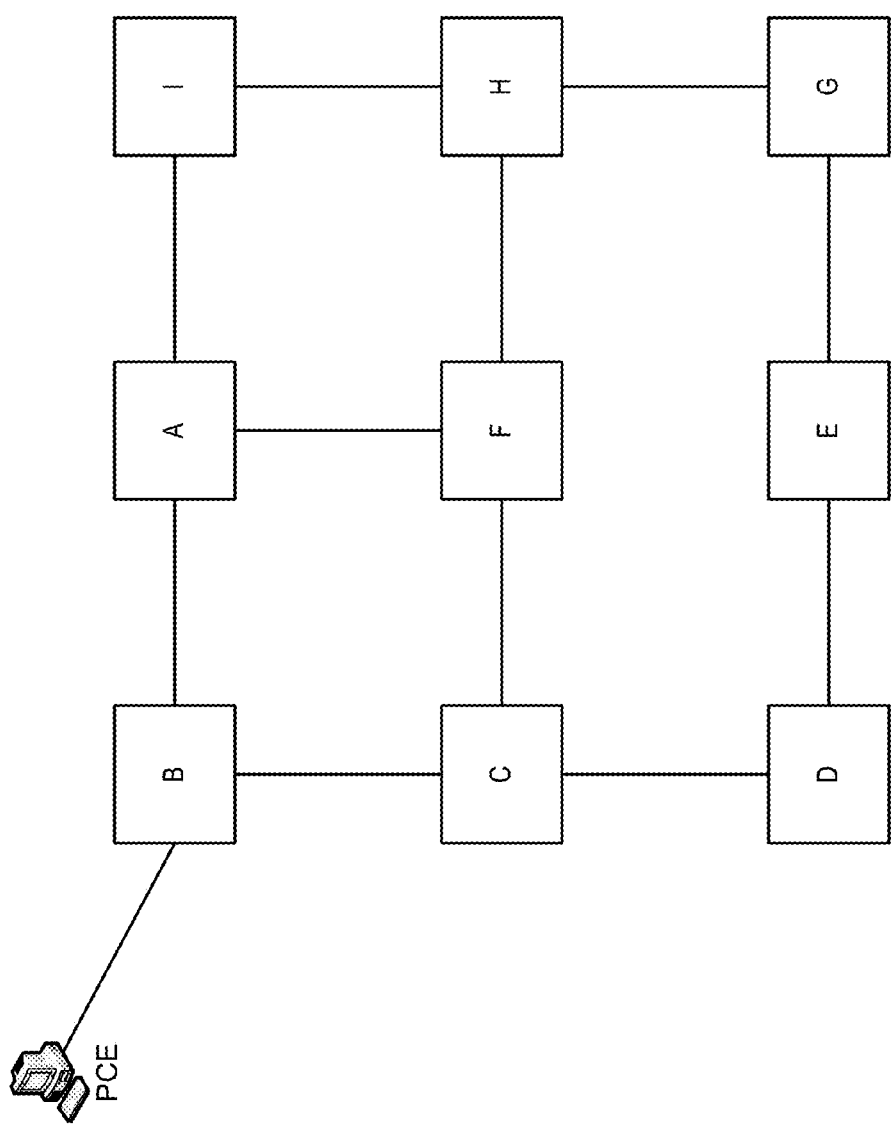
FIG. 1 illustrates an example of a data network.

In the following description, numerous specific details are set forth. However, it is understood that embodiments of the invention may be practiced without these specific details. In other instances, well-known circuits, structures and techniques have not been shown in detail in order not to obscure the understanding of this description.

It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein refers to any positive whole number of items including one item.

Terms

The following terms may be used in the description. Note that while the terms are explained herein for clarity of discussion, some of these and other related terms have been proposed in the IETF Draft, dated Jul. 12, 2013, entitled "An Architecture for IP/LDP Fast-Reroute Using Maximally Redundant Trees," and IEEE P802.1Qca/D0.5, dated Dec. 19, 2013, entitled "Bridges and Bridged Networks—Amendment: Path Control and Reservation," which are incorporated thereof by reference in their entirety.

Network graph: A graph that reflects the network topology where all links connect exactly two nodes and broadcast links have been transformed into the standard pseudo-node representation.

Redundant trees (RT): A pair of trees where the path from any node X to the root R along the first tree is node-disjoint with the path from the same node X to the root along the second tree. These can be computed in 2-connected graphs.

Maximally redundant trees (MRT): A pair of trees where the path from any node X to the root R along the first tree and the path from the same node X to the root along the second tree share the minimum number of nodes and the minimum number of links. Each such shared node is a cut-vertex. Any shared links are cut-links. Any RT is an MRT but many MRTs are not RTs.

Maximally disjoint trees (MDT): The same as MRT.

MRT-Red: MRT-Red is used to describe one of the two MRTs; it is used to describe the associated forwarding topology and MT-ID. Specifically, MRT-Red is the decreasing MRT where links in the GADAG are taken in the direction from a higher topologically ordered node to a lower one. Note that MRT-Red sometimes is referred to as a red tree. MRT-Blue (below) and MRT-Red together are also referred to as colored trees, independent trees, or recovery trees. A MRT-Blue and mapping MRT-Red together are sometimes referred to as an MRT pair.

MRT-Blue: MRT-Blue is used to describe one of the two MRTs; it is used to describe the associated forwarding topology and MT-ID. Specifically, MRT-Blue is the increasing MRT where links in the GADAG are taken in the direction from a lower topologically ordered node to a higher one.

Explicit path (EP): An explicitly defined path, where each node in the path is explicitly specified.

Equal cost tree (ECT): An Equal Cost Tree is a unique instantiation of a Shortest Path Tree (SPT) that uses a specific method to pick from equal cost path alternatives. In networks that have more than one diverse path between nodes, different Shortest Path Trees from the same root node that have equal cost paths from the root node to leaf nodes are considered Equal Cost Trees. ECT sometimes is referred to as equal cost multi-tree (ECMT). An ECT set is identified by an ECT algorithm and a VLAN is associated with a unique ECT-algorithm in one embodiment.

ECT algorithm: A shortest path tree (SPT) algorithm yielding a consistent result for a given root bridge when run by all bridges within an SPT Region.

Path computation element (PCE): An entry that is able to compute forwarding paths based on a network graph. A PCE is a higher layer entity (control plane application) in a network node or in an end station (host, server). A PCE is able to perform more complex computation tasks than a node local computation engine (NLCE), which is embedded within a node.

Point of local repair: A network node, e.g. a bridge/switch that locally redirects the data traffic to a backup path, e.g., to a loop free alternate path after a failure event.

Unicast: Sending a frame to a single destination node identified by a unique individual media access control (MAC) address.

Multicast: Sending a frame to a plurality of destination nodes simultaneously from a single source node where a unique group MAC address identifies the set of recipients.

Shortest path bridging—VLAN mode (SPBV): A type of SPB that is VLAN based, i.e., each shortest path tree being defined by a different VLAN Identifier (VID).

Shortest path bridging—MAC mode (SPBM): Another type of SPB in which the shortest path trees are MAC based, i.e., each shortest path tree being identified by a unique MAC address or an abbreviated form of MAC address. VLANs are used to delineate multipath variations.

Shortest path VID (SPVID): An SPVID identifies both the VLAN and the SPT that is used for the transmission of a tagged frame in SPBV.

2-connected: A graph that has no cut-vertices. This is a graph that requires two nodes to be removed before the network is partitioned.

2-connected cluster: A maximal set of nodes that are 2-connected.

2-edge-connected: A network graph where at least two links must be removed to partition the network.

Cut-link: A link whose removal partitions the network. A cut-link by definition must be connected between two cut-vertices. If there are multiple parallel links, then they are referred to as cut-links in this document if removing the set of parallel links would partition the network graph.

Cut-vertex: A vertex whose removal partitions the network graph.

Digraph: Directed graph.

Directed Acyclic Graph (DAG): A graph where all links are directed and there are no cycles in it.

Almost Direct Acyclic Graph (ADAG): A graph that, if all links incoming to the root were removed, would be a DAG.

Generalized Almost Directed Acyclic Graph (GADAG): A graph that is the combination of the ADAGs of all blocks.

Sub-Type/Length/Value (Sub-TLV): TLV is a short, variable length encoding of an information element consisting of sequential type, length, and value fields where the type field identifies the type of information, the length field indicates the length of the information field in octets, and the value field contains the information itself. Sub-TLV uses the same concept as TLVs. The difference is that TLVs exists inside a packet/frame, while sub-TLVs exist inside TLVs. Sub-TLVs are used to add extra information to particular TLVs. Each sub-TLV consists of three fields: a one-octet Type field, a one-octet Length field, and zero or more octets of Value. The Type field indicates the type of items in the Value field. The Length field indicates the length of the Value field in octets. Each sub-TLV can potentially hold multiple items. The number of items in a sub-TLV can be computed from the length of the whole sub-TLV, when the length of each item is known. Unknown sub-TLVs are to be ignored and skipped on receipt.

An electronic device (e.g., an end station, a network element) stores and transmits (internally and/or with other electronic devices over a network) code (composed of software instructions) and data using machine-readable media, such as non-transitory machine-readable media (e.g., machine-readable storage media such as magnetic disks; optical disks; read only memory; flash memory devices; and phase change memory) and transitory machine-readable transmission media (e.g., electrical, optical, acoustical or other form of propagated signals—such as carrier waves, and infrared signals). In addition, such electronic devices include hardware, such as a set of one or more processors coupled to one or more other components—e.g., one or more non-transitory machine-readable storage media (to store code and/or data) and network connections (to transmit code and/or data using propagating signals), as well as user input/output devices (e.g., a keyboard, a touchscreen, and/or a display) in some cases. The coupling of the set of processors and other components is typically through one or more interconnects within the electronic devices (e.g., busses and possibly bridges). Thus, a non-transitory machine-readable medium of a given electronic device typically stores instructions for execution on one or more processors of that electronic device to execute operations of embodiments of the invention as detailed herein below. One or more parts of an embodiment of the invention may be implemented using different combinations of software, firmware, and/or hardware.

As used herein, a network element (e.g., a router or a switch) is a piece of networking equipment, including hardware and software that communicatively interconnects other equipment on the network (e.g., other network elements, end systems). Some network elements are "multiple services network elements" that provide support for multiple networking functions (e.g., routing, bridging, VLAN (virtual LAN) switching, Layer 2 aggregation, session border control, Quality of Service, and/or subscriber management), and/or provide support for multiple application services (e.g., data, voice, and video). Subscriber end systems (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end systems (e.g., server end systems) belonging to a service or content provider or end systems participating in a peer to peer service, and may include, for example, public webpages (e.g., free content, store fronts, search services), private webpages (e.g., username/password accessed webpages providing email services), and/or corporate networks over VPNs. Typically, subscriber end systems are coupled (e.g., through customer premise equipment coupled to an access network (wired or wirelessly)) to edge network elements, which are coupled (e.g., through one or more core network elements) to other edge network elements, which are coupled to other end systems (e.g., server end systems). A network element is generally identified by its media access control (MAC) address, Internet protocol (IP) address/subnet, network sockets/ports, and/or upper OSI layer identifiers.

Network elements are commonly separated into a control plane and a data plane (sometimes referred to as a forwarding plane or a media plane). In the case that the network element is a router (or is implementing routing functionality), the control plane typically determines how data (e.g., packets) is to be routed (e.g., the next hop for the data and the outgoing port for that data), and the data plane is in charge of forwarding that data. For example, the control plane typically includes one or more routing protocols (e.g., an exterior gateway protocol such as Border Gateway Protocol (BGP) (RFC 4271), Interior Gateway Protocol(s) (IGP) (e.g., Open Shortest Path First (OSPF) (RFC 2328 and 5340), Intermediate System to Intermediate System (IS-IS) (RFC 1142), Routing Information Protocol (RIP) (version 1 RFC 1058, version 2 RFC 2453, and next generation RFC 2080)), Label Distribution Protocol (LDP) (RFC 5036), Resource Reservation Protocol (RSVP) (RFC 2205, 2210, 2211, 2212, as well as RSVP-Traffic Engineering (TE): Extensions to RSVP for LSP Tunnels RFC 3209, Generalized Multi-Protocol Label Switching (GMPLS) Signaling RSVP-TE RFC 3473, RFC 3936, 4495, and 4558)) that communicate with other network elements to exchange routes and select those routes based on one or more routing metrics. In addition, the control plane also typically includes ISO layer 2 control protocols such as Rapid Spanning Tree Protocol (RSTP), Multiple Spanning Tree Protocol (MSTP), and SPB (Shortest Path Bridging), which have been standardized by various standard bodies (e.g., SPB has been defined in IEEE Std 802.1aq-2012).

Routes and adjacencies are stored in one or more routing structures (e.g., Routing Information Base (RIB), Label Information Base (LIB), one or more adjacency structures) on the control plane. The control plane programs the data plane with information (e.g., adjacency and route information) based on the routing structure(s). For example, the control plane programs the adjacency and route information into one or more forwarding structures (e.g., Forwarding Information Base (FIB), Label Forwarding Information Base (LFIB), and one or more adjacency structures) on the data plane. The data plane uses these forwarding and adjacency structures when forwarding traffic.

Typically, a network element includes a set of one or more line cards, a set of one or more control cards, and optionally a set of one or more service cards (sometimes referred to as resource cards). These cards are coupled together through one or more interconnect mechanisms (e.g., a first full mesh coupling the line cards and a second full mesh coupling all of the cards). The set of line cards make up the data plane, while the set of control cards provide the control plane and exchange packets with external network elements through the line cards. The set of service cards can provide specialized processing (e.g., Layer 4 to Layer 7 services (e.g., firewall, Internet Protocol Security (IPsec) (RFC 4301 and 4309), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms.

As used herein, a node forwards IP packets on the basis of some of the IP header information in the IP packet; where IP header information includes source IP address, destination IP address, source port, destination port (where "source port" and "destination port" refer herein to protocol ports, as opposed to physical ports of a network element), transport protocol (e.g., user datagram protocol (UDP) (RFC 768, 2460, 2675, 4113, and 5405), Transmission Control Protocol (TCP) (RFC 793 and 1180), and differentiated services (DSCP) values (RFC 2474, 2475, 2597, 2983, 3086, 3140, 3246, 3247, 3260, 4594, 5865, 3289, 3290, and 3317). Nodes are implemented in network elements. A physical node is implemented directly on the network element, whereas a virtual node is a software, and possibly hardware, abstraction implemented on the network element. Thus, multiple virtual nodes may be implemented on a single network element.

A network interface may be physical or virtual; and an interface address is an IP address assigned to a network interface or a MAC address, be it a physical network interface or virtual network interface. A physical network interface is hardware in a network element through which a network connection is made (e.g., wirelessly through a wireless network interface controller (WNIC) or through plugging in a cable to a port connected to a network interface controller (NIC)). Typically, a network element has multiple physical network interfaces. A virtual network interface may be associated with a physical network interface, with another virtual interface, or stand on its own (e.g., a loopback interface, a point to point protocol interface). A network interface (physical or virtual) may be numbered (a network interface with an IP address or a MAC address) or unnumbered (a network interface without an IP address or MAC address). A loopback interface (and its loopback address) is a specific type of virtual network interface (and IP address or MAC address) of a node (physical or virtual) often used for management purposes; where such an IP address is referred to as the nodal loopback address. The IP address(es) or MAC address(es) assigned to the network interface(s) of a network element, are referred to as IP or MAC addresses of that network element; at a more granular level, the IP or MAC address(es) assigned to network interface(s) assigned to a node implemented on a network element, can be referred to as IP addresses of that node.

GADAG and MRT

FIG. 1 illustrates an example of a data network. Network 100 contains nodes A-I. Each node can be a network element discussed herein above. The network 100 also contains a PCE defined herein above. In some embodiments, the PCE is also implemented as a network element separately from nodes A-I. In other embodiment, the functions of the PCE are implemented within nodes A-I. One way to offer protection is to deploy maximally redundant trees (MRTs). MRTs can be used for protection of the shortest path by means of fast reroute, as discussed in the IETF Draft, dated Jul. 12, 2013, entitled "An Architecture for IP/LDP Fast-Reroute Using Maximally Redundant Trees," which is incorporated by reference herein. For example, the node at point of local repair sends a frame/packet on the unaffected MRT rooted by the destination address if the shortest path link goes down, assuming it is predetermined for each link of the network which MRT (Blue or Red) to be used by the node if a given link or the neighbor node attached to it goes down. In order to compute MRT, one needs to compute the GADAG first.

Figure 2:
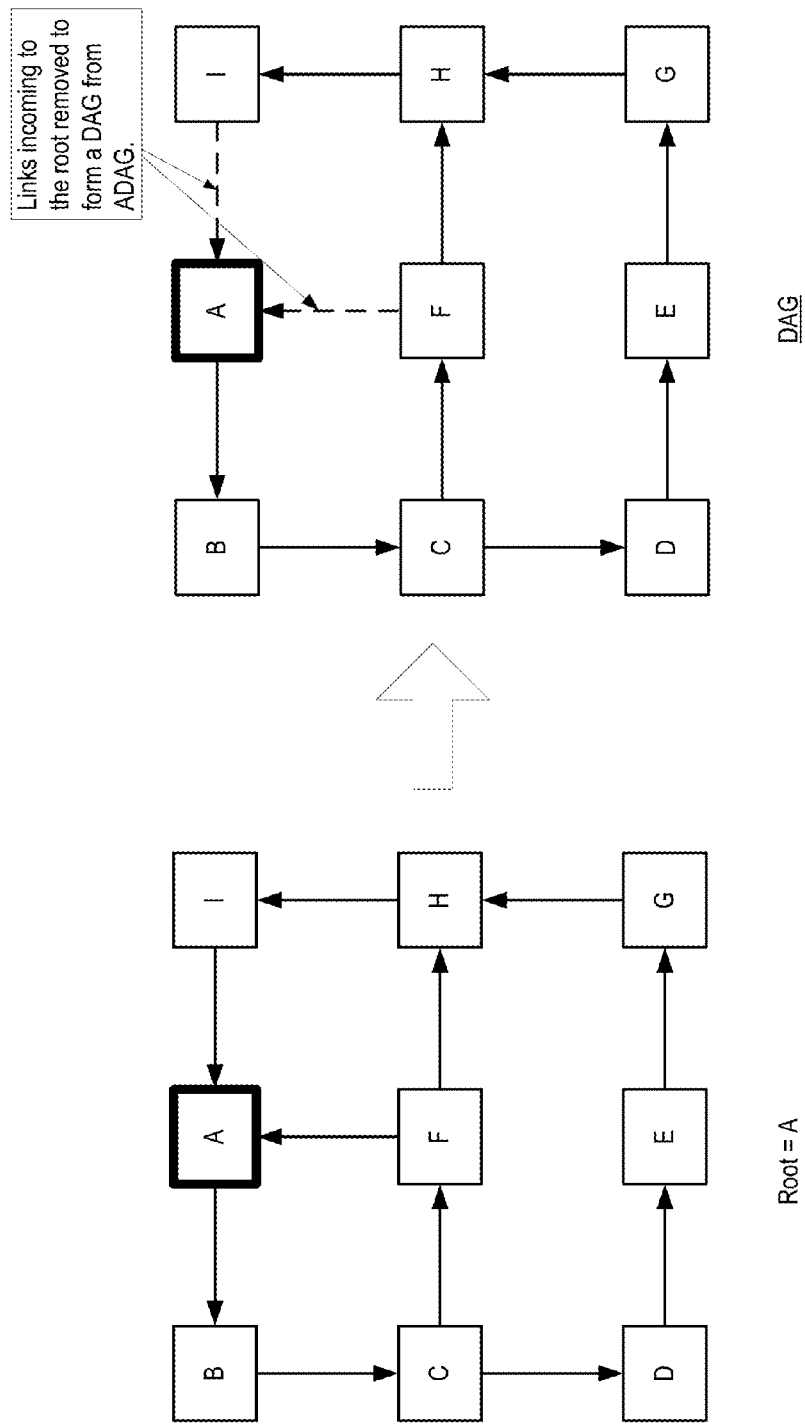
FIG. 2 illustrates an almost directed acyclic graph (ADAG) and a directed acyclic graph (DAG).

FIG. 2 illustrates an almost directed acyclic graph (ADAG) and a directed acyclic graph (DAG). The ADAG and DAG are graph abstraction of network 100 of FIG. 1. In the graphs, each node becomes a vertex of the graphs and each link between the nodes becomes an edge of the graphs. The graphs are directed graphs. In the DAG of network 100, it contains no directed cycle. The DAG can represent as a partial order of vertices. For example, it captures the partial order of vertices A and I as A<B<C<F<H<I. It is only a partial order because not necessarily all relations are defined by a DAG. For example, the DAG in FIG. 2 does not provide any information on the relations between F and D, F and E, or F and G.

As defined, the ADAG of network 100 has a root at node A (denoted with a heavy square in the figure), and the ADAG is the graph of network 100, where if all links incoming to the root A were removed, it would become the DAG illustrated at the right of the figure. A generalized ADAG (GADAG) includes ADAGs of all blocks, including graphs that are not 2-connected.

Figure 3B:
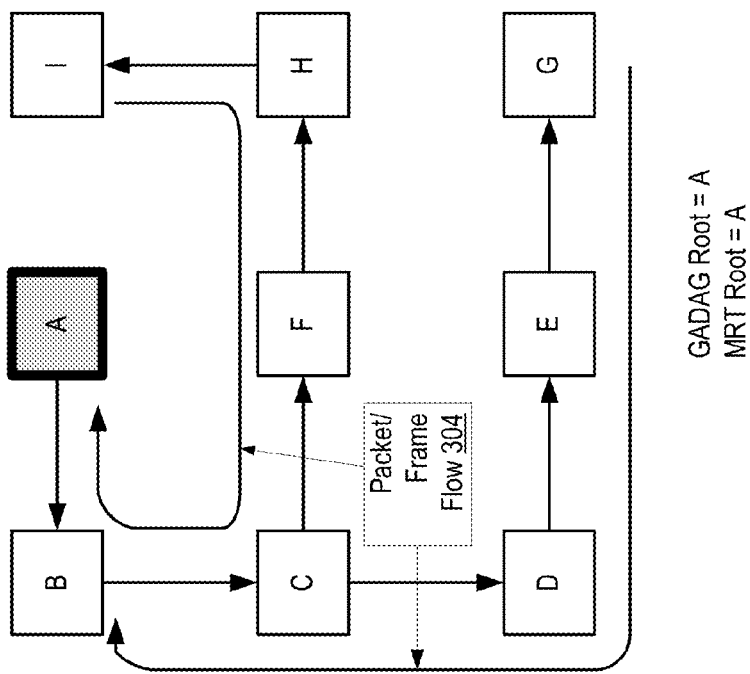
FIGS. 3A-3B are block diagrams illustrating the MRT-Blue and MRT-Red paths where the GADAG root and MRT root are at a same node.
Figure 3A:
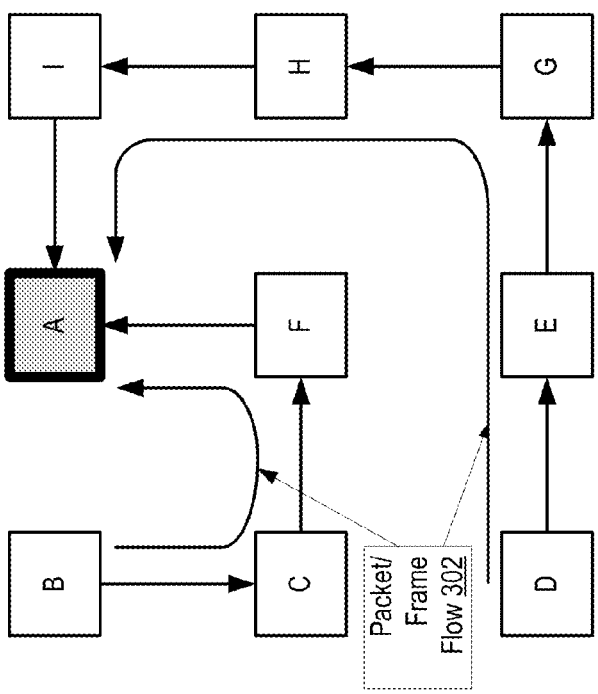

FIGS. 3A-3B are block diagrams illustrating the MRT-Blue and MRT-Red paths where the GADAG root and MRT root are at the same node. In the figures, the node that is the MRT root is denoted with a darker background, and both the GADAG root and the MRT root are at node A. MRT-Blue and MRT-Red represent a pair of directed spanning trees that provide maximally disjoint paths toward the common root (MRT root at node A).

Note that in the MRT-Blue path, packet/frame flow at reference 302 follows ascending GADAG order from all nodes to the MRT root. In contrast, in the MRT-Red path, packet/frame flow at reference 304 follows descending GADAG order from all nodes to the MRT root. In other words, computation of GADAG to determine the ordering of the nodes is the first step to computing MRT-Blue and MRT-Red for a given MRT root.

At each node, packets/frames use different ports to reach an MRT root when feasible. For example, at node B, assuming port 1 is used in MRT-Blue to reach root A. Port 1 is coupled to the link connecting to node C. In MRT-Red, to reach root A, a different port (called port 2) coupled to the link connecting to node A is used for packet/frame flow 304. The separation of ports for traffic represents a degree of disjointedness when implementing the MRT-Blue and MRT-Red graphs in a network.

Figure 4B:
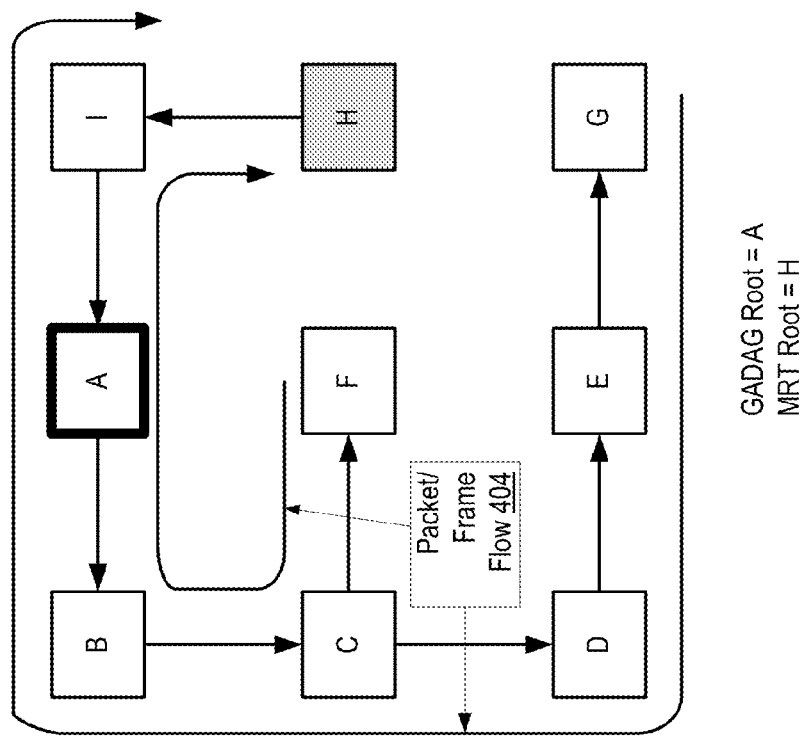
FIGS. 4A-4B are block diagrams illustrating the MRT-Blue and MRT-Red path where the GADAG root and MRT root are at different nodes.
Figure 4A:
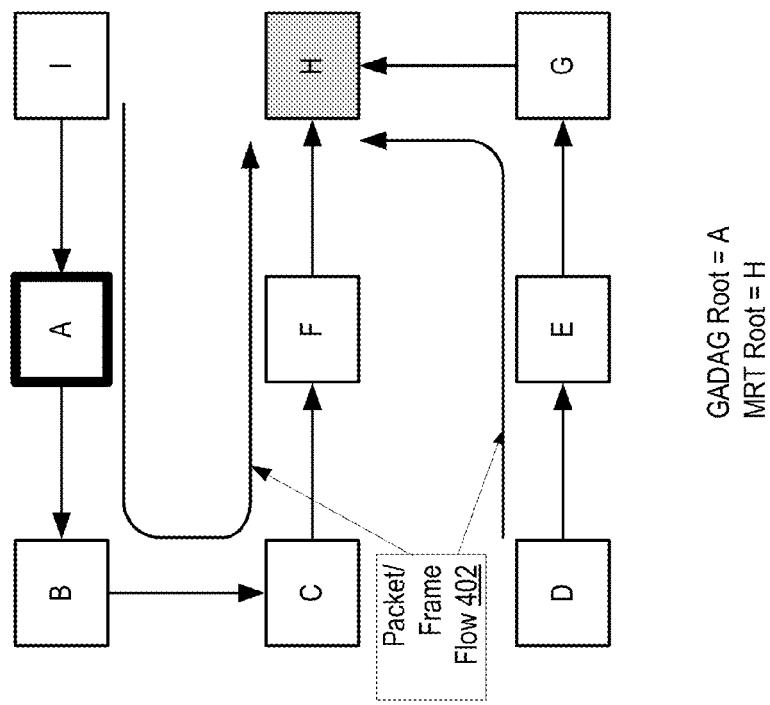

FIGS. 4A-4B are block diagrams illustrating the MRT-Blue and MRT-Red path where the GADAG root and MRT root are at different nodes. Once a GADAG root is determined, the GADAG may be computed. Yet, for a given GADAG, there can be multiple MRT roots resulting in different MRT graphs. FIGS. 4A-4B illustrate a scenario where the GADAG root is node A and MRT root is H. In this case, the MRT-Blue and MRT-Red are different from FIGS. 3A-3B. In other words, for the same GADAG with root A, the MRT-Blue and MRT-Red can be different for different MRT roots. Thus, the same GADAG can be used for computing all the MRTs for all the MRT roots in a network, using a given MRT algorithm. Given that the GADAG is the same, the GADAG computation can be done only once while the MRT computation needs to be repeated for each MRT root. Thus it is possible to allocate the MRT computation to achieve better computational efficiency.

Methods of Deploying MRTs in a Network

As discussed herein, better network redundancy may be achieved through determining MRT-Blue and MRT-Red for a given MRT root, thus a node may route traffic to a selected route along MRT-Blue or MRT-Red upon a topology change. For example, when the shortest path tree (SPT) a packet/frame transmitted through is broken, the packet/frame may switch to either MRT-Blue or MRT-Red path immediately.

Figure 5:
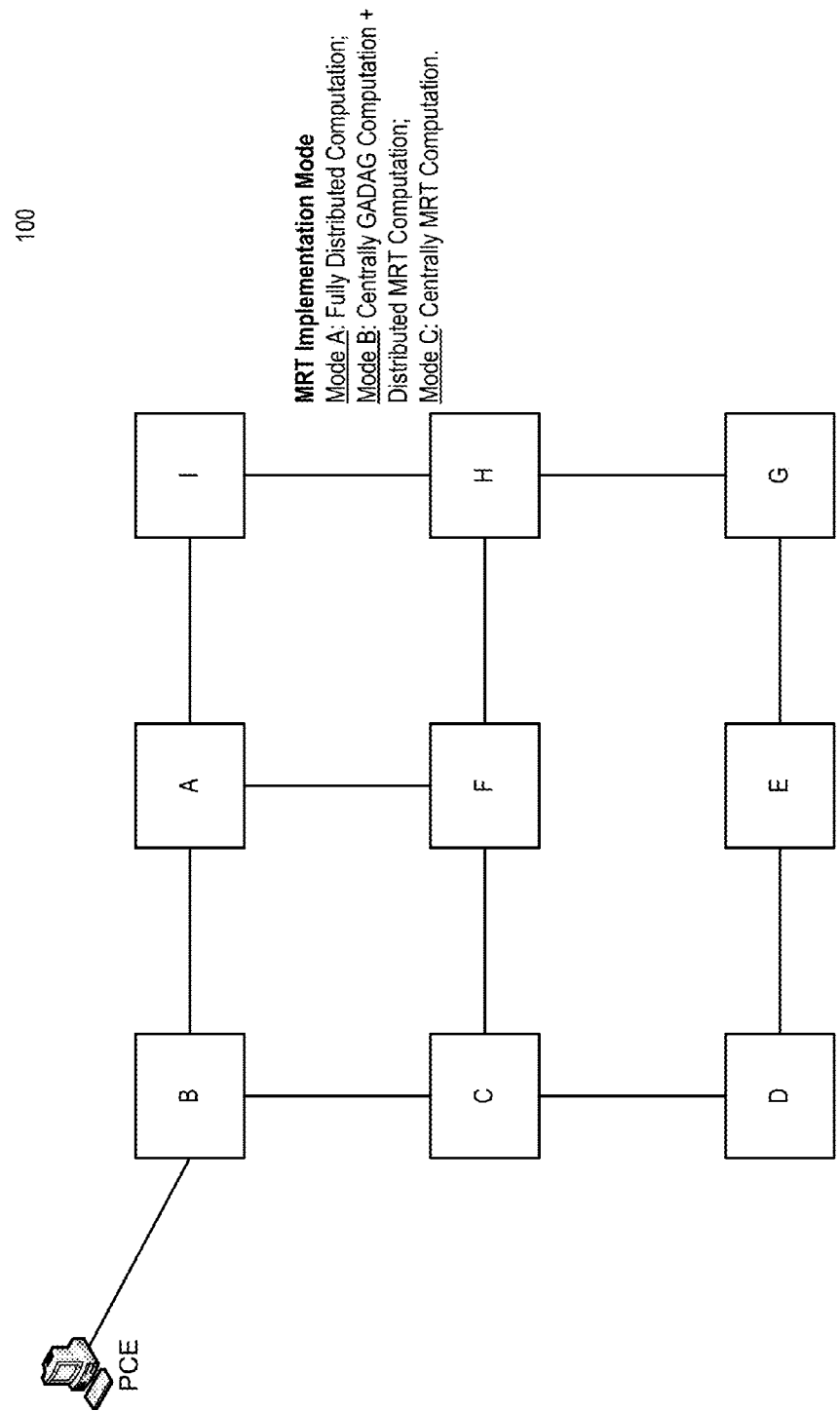
FIG. 5 is a block diagram illustrating three modes of MRT implementation according to one embodiment of the invention.

FIG. 5 is a block diagram illustrating three modes of MRT implementation according to one embodiment of the invention. Network 100 in FIG. 5 is the same as illustrated in FIG. 1, where the network comprises node A-I and a PCE. For the network to deploying MRTs, it may operate in one of three modes: modes A, B, and C.

In mode A, the computation of MRTs utilizes a fully distributed computation. In the fully distributed computation, each node computes a GADAG for the topology, and then each node determines the respective MRT-Blue and MRT-Red for one or more given MRT roots. In mode A, each node is configured with the ECT algorithm used to compute the respective MRT-Blue and MRT-Red, and to use the resulting MRT-Blue and MRT-Red for routing.

In mode B, the computation of MRTs is divided into two parts, and a PCE and nodes share the computation responsibility. Specifically, the PCE computes a GADAG for the network, and the description of the GADAG is then distributed to each node, and the nodes compute the MRT-Blue and MRT-Red for one or more given MRT roots. Because the common GADAG computation is not repeated at each node, mode B likely reduces overall computation compared to mode A.

In mode C, the computation of MRTs is centralized at a PCE of the network. The PCE computes both the GADAG for the network and the MRTs for one or more given MRT roots for all nodes. The description of the computed MRTs is then distributed to each node. The advantage of mode C is that the centralized computation reduces the need of computation at individual nodes, and it can be very effective in some implementation such as a software-defined networking (SDN) system. However, with all the description of the computed MRTs in need of distribution to every node, the amount of communication required might be substantial and the mode may be viewed as too "chatty."

The three modes (referred to as MRT deployment modes) are referred to as fully distributed computation mode (mode A), centrally computed GADAG mode (mode B), and centrally computed MRT mode (mode C). The embodiments of the invention disclose ways to optimize deployment of MRTs in these modes.

Setting Up a Network for Deploying MRT

For a network to deploy MRT, each node of a network needs to work in the same mode. In addition, the network needs to denote the MRTs consistently. For a layer 2 network, each MRT-Blue and MRT-Red may be associated with a VLAN ID (VID). The association needs to be communicated between nodes to be consistent in the network. One way to communicate the association is through exchanging sub-TLVs of the routing protocol, e.g. via IS-IS.

Figure 6:
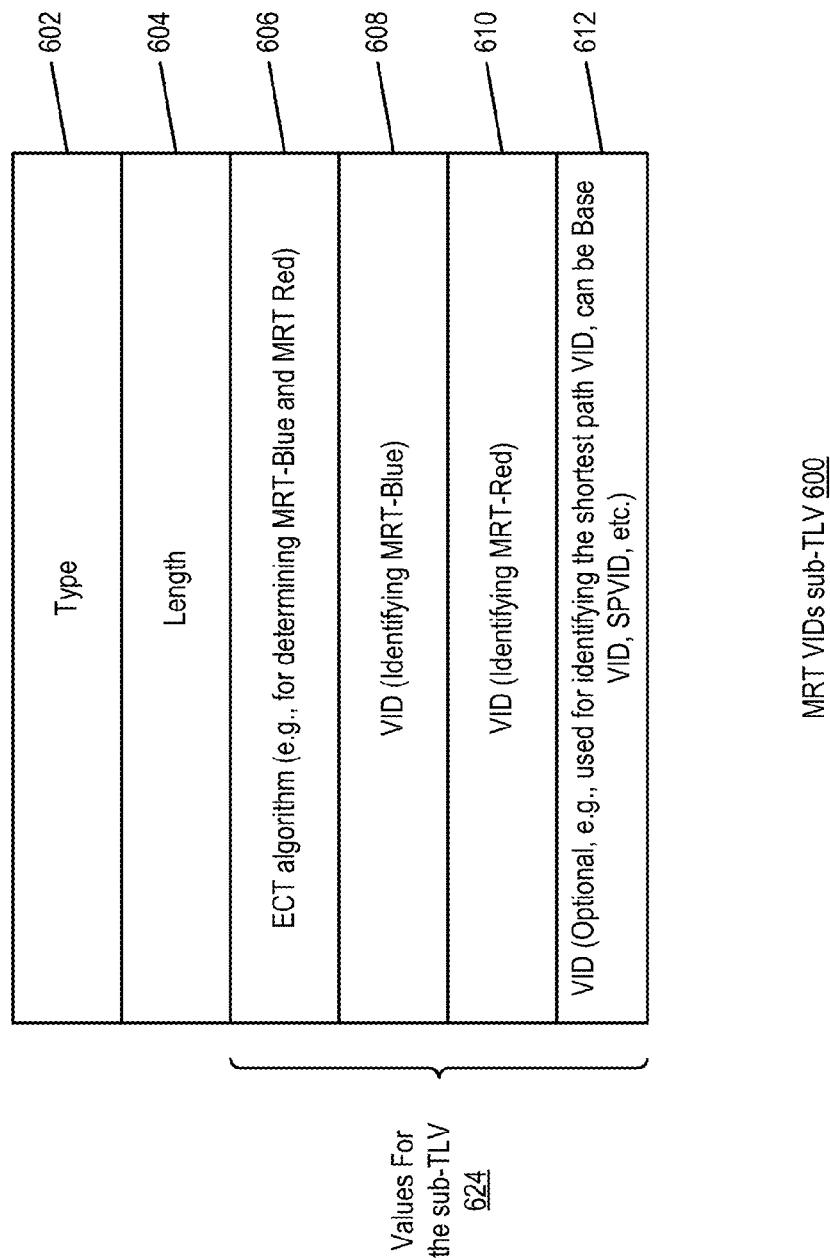
FIG. 6 is a block diagram illustrating an MRT VID sub-TLV according to one embodiment of the invention.

FIG. 6 is a block diagram illustrating a MRT VID sub-TLV according to one embodiment of the invention. The sub-TLV may be embedded in a PDU of a routing protocol (e.g., a Hello PDU) and it may be generated at each node (in modes A or B). It may be generated at PCE (in modes B or C) and distributed to each node using a link state packet (LSP) or a link state advertisement (LSA).

The sub-TLV contains a type field 602 to indicate the type of the sub-TLV for MRT VID mapping. It also contains a length field 604 to indicate the total length of the sub-TLV. It then contains fields for the values for the sub-TLV at reference 624. The values for the sub-TLV include several parameters. One is the ECT algorithm identifying the MRT Algorithm to be used for determining MRT-Blue and MRT-Red at reference 606. There are a number of predefined ECT algorithms, and each produces a shortest path tree (SPT). The network needs to be consistent at what ECT algorithm for each node (and/or PCE) to use in finding the SPT. For example, an IETF Draft, dated Oct. 21, 2013, entitled "Algorithms for Computing Maximally Redundant Tree for IP/LDP Fast Reroute," which is incorporated by reference in its entirety herein, discloses using a standard MRT Lowpoint algorithm for computing MRTs. The embodiments of the invention use the ECT algorithm to identify the MRT Lowpoint algorithm.

FIG. 7 is a block diagram illustrating an equal cost tree (ECT) algorithm mapping according to one embodiment of the invention. In the mapping table, each ECT algorithm is identified by a value, and each ECT algorithm is corresponding to a MRT deployment mode. In this example, ECT algorithm 00-80-C2-20 represents MRT deployment mode C, ECT algorithm 00-80-C2-21 represents MRT deployment mode A, and ECT algorithm 00-80-C2-23 represents MRT deployment mode B. Obviously, any hexadecimal value may represent an ECT algorithm used at each mode, and the hexadecimal value illustrated is an example only.

Also note that the table in FIG. 7 may be an extension or variation of Table 45-1 of IEEE P802.1Qca/D0.5 cited herein above, where ECT algorithms values are selected for explicit and constrained paths.

Referring back to FIG. 6, the values for the sub-TLV contain different VID values, one is VID for identifying MRT-Blue (sometimes referred to as Blue VID) at reference 608, one is VID for identifying MRT-Red (sometimes referred to as Red VID) at reference 610, and another VID (optional) at reference 612 may be used for identifying the shortest path VID, which can be base VID or SPVID). Note that VID 612 may be utilized when MRT-Blue and MRT-Red are utilized not to protect each other, but to protect the shortest path.

In a different embodiment, the order of the various fields within the values for the sub-TLV may be different and more or less fields as illustrated may be included. In some embodiments, the order of the fields indicates which VID serves what purpose (e.g., the first VID being the Blue VID, the second being the Red VID, and the third being the SPVID). In alternate embodiments, one or more flags indicate which VID serves what purpose (e.g., a flag on a field denoting a Blue VID).

While using the new MRT VID sub-TLV is one way to set up a Layer 2 network for deploying MRT, one may use a SPB instance sub-TLV to communicate necessary information to set up the Layer 2 network for deploying MRT too.

In a SPB instance sub-TLV, one or two VLAN ID tuples are present, and ECT algorithm field conveys the ID of MRT algorithm. If one VLAN ID tuple is there, the base VID field conveys the Blue VID value while the SPVID field conveys the Red VID value. If two VLAN ID tuples are there, then the base VID field of tuple 1 is equal to the base VID field of tuple 2, where the base VID may be used for the shortest path. The SPVID field of tuple 1 conveys the Blue VID and the SPVID field of tuple 2 conveys the Red VID. Note the SPB instance sub-TLV may be constructed differently as well to convey the same ECT algorithm, Blue VID, Red VID, and SPVID values.

For a Layer 3 network, multi-topology identifiers (MT-IDs) are used for the identification of MRT-Blue and MRT-Red, where MT-IDs are communicated through either OSPF or IS-IS protocols.

Deploying MRTs in a Network Through Mode A

Once a network is set up through the method discussed herein above, MRTs may be deployed in the network. MRTs may be deployed through mode A, that is, computation MRTs in a fully distributed fashion and each node computes GADAG for the network and MRT computation for one or more MRT roots.

For computing GADAG of a network, a GADAG root needs to be identified. In one embodiment, bridge identifier (ID) is used for GADAG root selection. Note that bridge ID has a priority field that can be utilized. Once the GADAG root is identified, one of the known algorithms may be utilized to determine the GADAG for the network and then MRTs for MRT roots may be computed.

Figure 8:
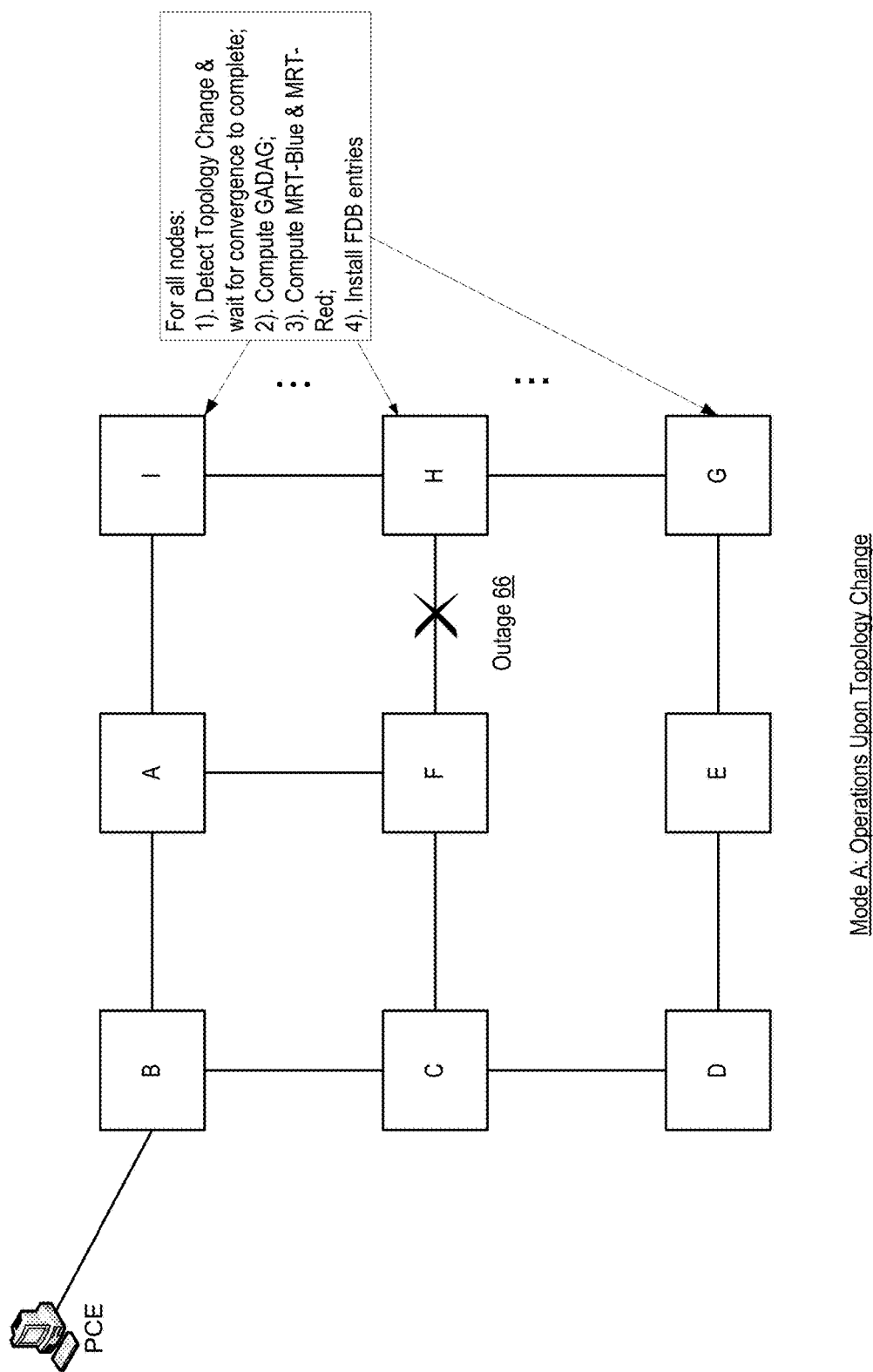
FIG. 8 is a block diagram illustrating an MRT implementation according to one embodiment of the invention.

FIG. 8 is a block diagram illustrating an MRT implementation according to one embodiment of the invention. The method may be implemented in a layer 2 network. It is triggered by a topology change. The topology change may be due to a link outage such as outage 66 as illustrated, a node down, a node addition, or any other conditions impacting the topology of the network.

Referring to FIG. 8, at all nodes, each node performs the following without the involvement of the PCE. It first detects a topology change and then waits for convergence to complete, which happens after the topology change. While the network is converging, data traffic is redirected, if possible, after a failure event. In this example, nodes F and/or H (points of local repair, or PLR) immediately detect the failure and nodes F and/or H redirect data traffic to the current maximally redundant trees (MRTs) that have survived the failure if there are computed MRTs for the nodes. The MRTs are for one or more MRT roots, each corresponding to an MRT pair. If there are no computed MRTs for the nodes, the nodes compute the shortest path and install the corresponding forwarding states.

Then each node computes the GADAG of the network, and it is followed by computing MRT-Blue and MRT-Red based on the new topology at each node. Based on the computed MRT-Blue and MRT-Red, the node installs filtering database (FDB) entries for the computed MRT-Blue and MRT-Red, and the FDB entries may be utilized for protection in future topology change.

Since all the computations of GADAG and MRTs are performed on an individual node basis, communication between nodes and between nodes and the PCE is minimized, but with each node performing all the computation, the nodes require more computational power than mode B or C.

Figure 9:
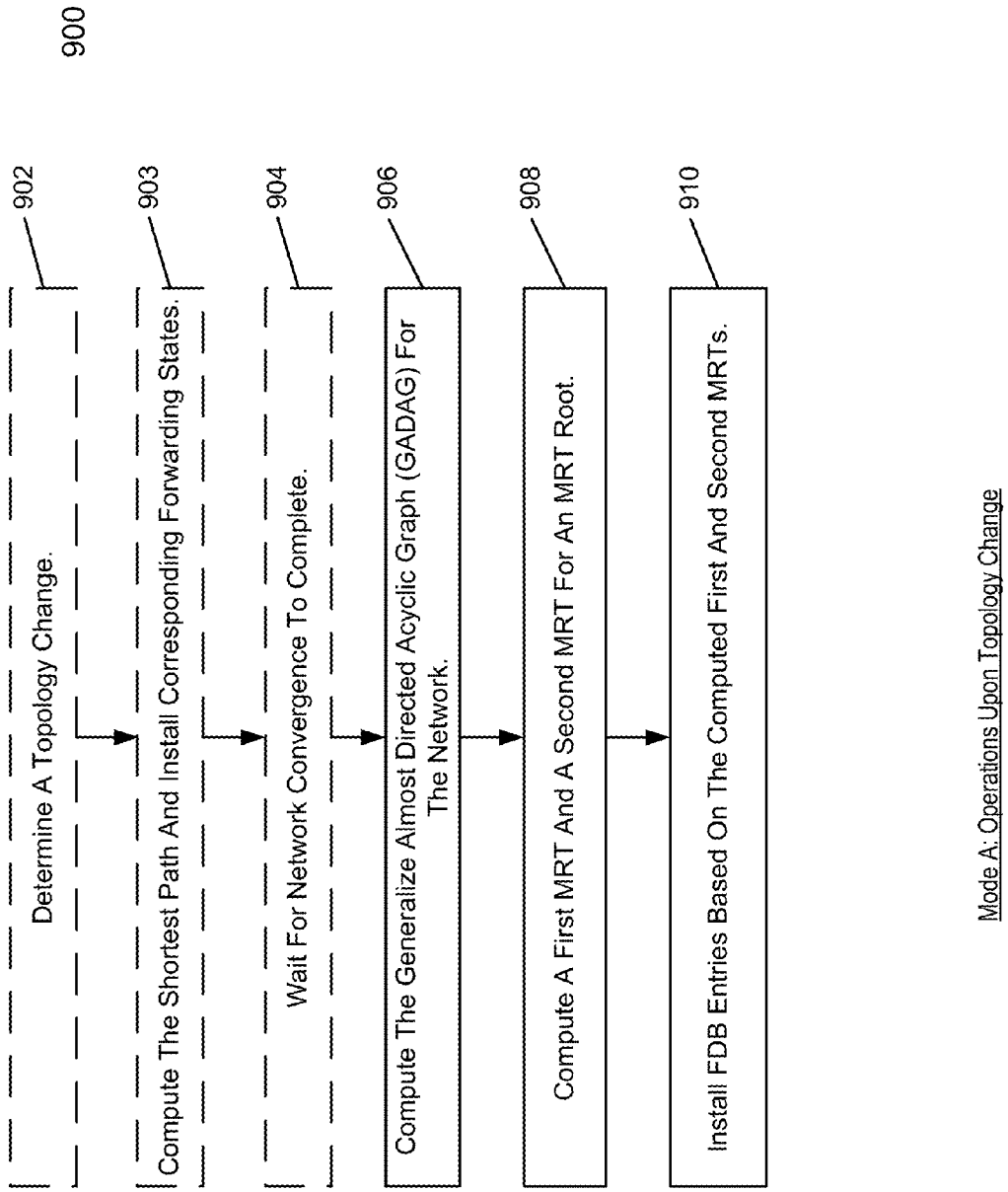
FIG. 9 is a flow diagram illustrating an MRT implementation according to one embodiment of the invention.

FIG. 9 is a flow diagram illustrating an MRT implementation according to one embodiment of the invention. The method 900 may be implemented at network nodes (or simply nodes) in a Layer 2 network. The Layer 2 network contains a number of network elements as nodes/bridges, and it may or may not contain a standalone PCE for path computation.

The method may optionally start with a node determining a topology change at reference 902. The topology change may be due to a link outage such as outage 66 as illustrated in FIG. 8, a node down, a node addition, or any other conditions impacting topology of the network. Once the topology change is determined, the flow goes to reference 903, where the node computes the shortest path and installs corresponding forwarding states. In an alternative embodiment, instead of computing the shortest path and installing corresponding forwarding states, the node contains computed MRTs and corresponding installed forwarding state, in which case the node selects the MRTs that have survived the topology change, and redirect the data traffic to the survived MRTs accordingly. Then the node waits for completion of network convergence at reference 904. The node may simply wait for period of time (e.g., simply waiting "long enough"), or it may get an indication that the network convergence has completed. Note a number of more sophisticated approaches may be implemented in determining whether the network convergence has been completed or not.

The node computes the generalized almost directed acyclic graph (GADAG) for the network at reference 906. In one embodiment, bridge ID is utilized for GADAG root selection. Once the root is selected, one of the known algorithms may be utilized to determine the GADAG for the network. Then at reference 908, the node computes a first MRT (e.g., MRT-Blue) and a second MRT (e.g., MRT-Red), where each pair of the first MRT and the second MRT is for one MRT root, and the node may contain one or more MRT roots. In one embodiment, each node in the network is an MRT root thus the MRT pairs for each node need to be computed. In another embodiment, only selected nodes in the network are MRT roots, and the node only needs to compute MRT pairs for the selected nodes. In one embodiment, the computation of the GADAG and MRTs utilizes an MRT lowpoint algorithm, such as the one proposed in the IETF Draft, dated Oct. 21, 2013, entitled "Algorithms for Computing Maximally Redundant Tree for IP/LDP Fast Reroute," where the MRT lowpoint algorithm is mapped to one or more ECT algorithms.

Then at reference 910, the node installs filter database (FDB) entries based on the computed first MRT and second MRT (the MRT pairs). The FDB entries may be identified by tuples of <Blue VID, MAC> and <Red VID, MAC>, which maps VIDs with particular MAC addresses. Note that an MRT tree may be "from the root" or "to the root." For example, for unicast traffic, the MRT tree typically is to the root, and for multicast traffic, the MRT tree typically is from the root, and FDB entries may be installed differently for different traffic types.

Note installing the FDB entries should aim at not causing traffic outage. Thus, at least one of the trees should be untouched while another is updated through installing the FDB entries. In one embodiment, there are three types of trees involved, and they are the shortest path trees (SPTs), MRT-Blues, and MRT-Reds. In this case, the SPT tree has been computed first and the corresponding FDB entries are installed at reference 903. In another embodiment, there are two types of trees involved, and they are MRT Blues and MRT Reds. In both embodiments, at reference 910, the node updates FDB for one tree at a time. For example, installing the FDB entries for a MRT Blue first and installing the FDB entries for its corresponding MRT red afterward.

Note that references 902-904 are optional steps for method 900. The computation of GADAG and MRT pairs in references 906-910 may be triggered in other scenarios, e.g., a network initiation process. Also note that for method 900 to be deployed in nodes of a network, the nodes need to agree on the ECT algorithm to be used, VID values for MRT-Blue, MRT-Red, and SPT (when applicable). That is, the process disclosed in discussion relating to FIGS. 6-7 or another process providing setup consistency among the nodes has been completed.

Deploying MRTs in a Network Through Mode B

MRT deployment mode B (centrally computed GADAG mode) utilizes a standalone PCE to perform GADAG computation for a network, while it lets nodes of the network compute MRT pairs individually. Similar to mode A, a GADAG root needs to be identified for computing GADAG for the network, and the bridge ID is used for the GADAG root selection in one embodiment.

Figure 10:
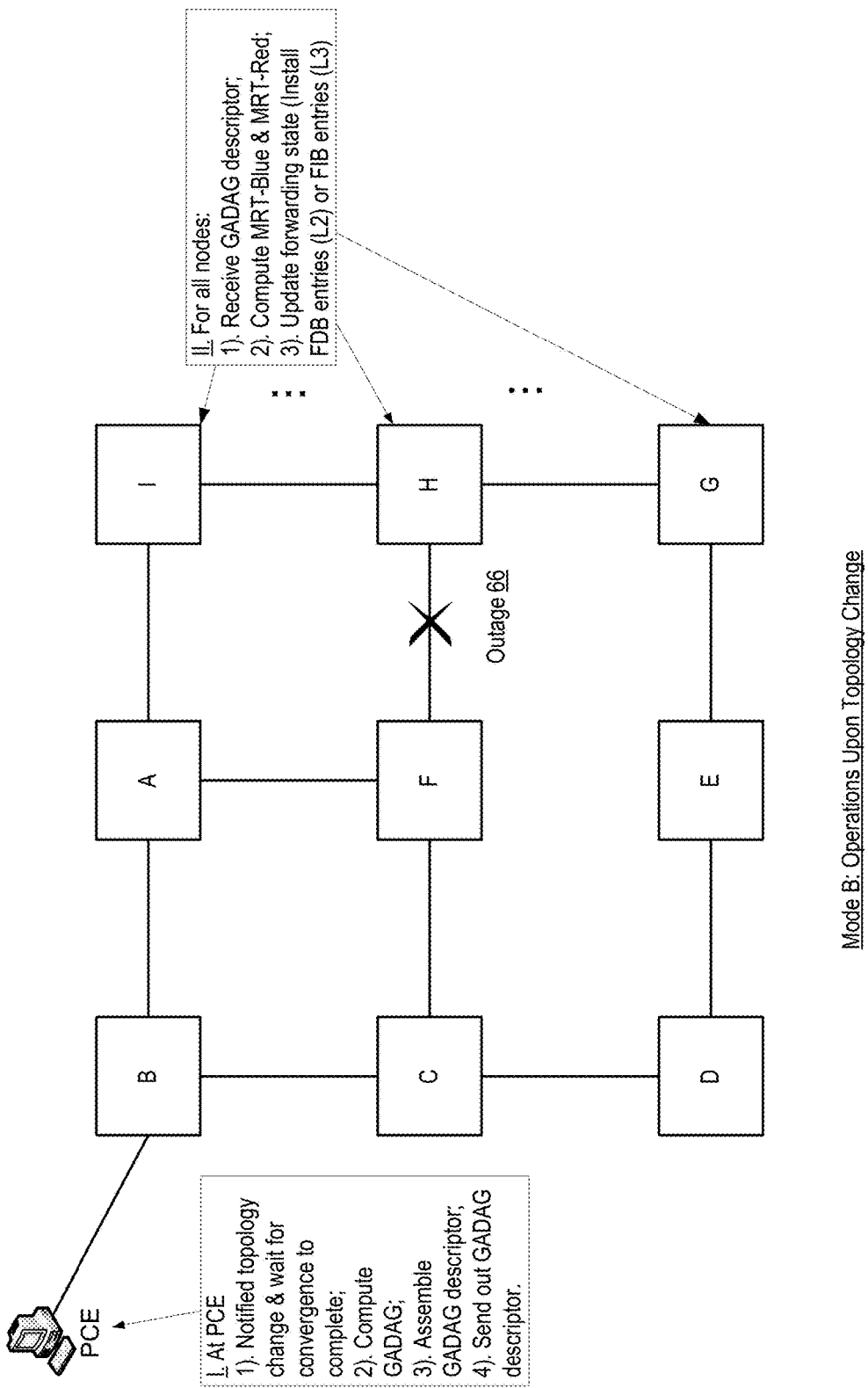
FIG. 10 is a block diagram illustrating another MRT implementation according to one embodiment of the invention.

FIG. 10 is a block diagram illustrating another MRT implementation according to one embodiment of the invention. The method may be implemented in a Layer 2 or Layer 3 network. The process is triggered by a topology change. The topology change may be due to a link outage such as outage 66 as illustrated, a node down, a node addition, or any other conditions impacting topology of the network.

Referring to FIG. 10, task boxes I and II illustrates the order in which operations are performed according to one embodiment of the invention. At task box I, after the PCE is notified of topology change, it waits for network convergence to complete. Then it computes GADAG for the network. Then it assembles a GADAG descriptor, which describes the computed GADAG. The GADAG descriptor then is distributed to the nodes of the network.

At task box II, each node receives the GADAG descriptor, and it computes MRT-Blue and MRT-Red for each of one or more MRT roots. Then it updates its forwarding state. If the network is a Layer 2 network, it installs FDB entries corresponding to VIDs for MRT-Blue and MRT-Red respectively. If the network is a Layer 3 network, it installs forward information base (FIB) entries.

Since the computation of GADAG and MRTs are distributed between PCE and nodes, the computation of GADAG, which is common among the nodes, is not repeated at the nodes, thus the computation is less intense at the nodes deploying MRTs in mode B comparing the nodes deploying MRTs in mode A. Yet, mode B requires more communication between PCE and the nodes, as the computed GADAG at the PCE needs to be communicated to the nodes, but this is just a single PDU sent from the PCE to the node only once.

Figure 11:
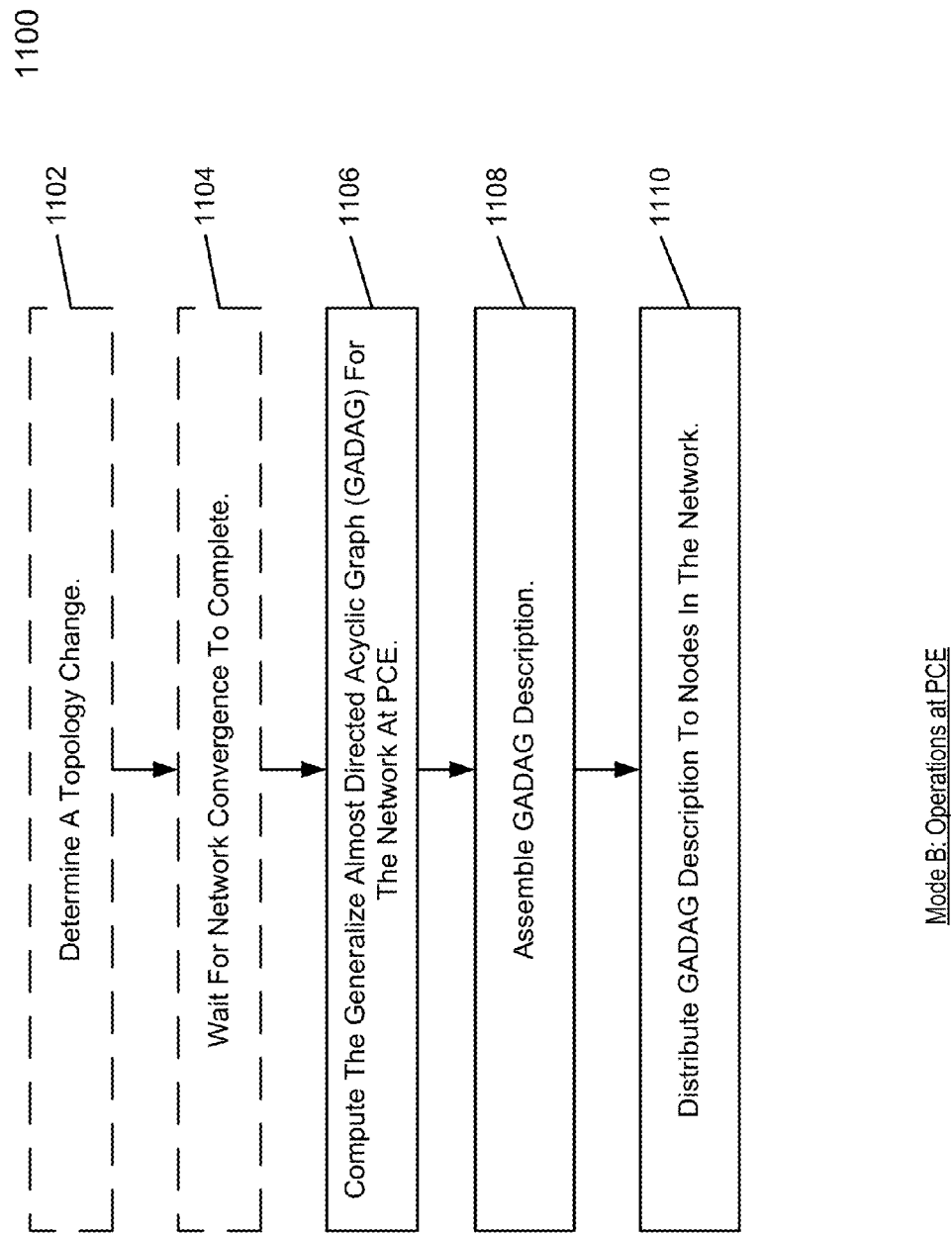
FIG. 11 is a flow diagram illustrating GADAG computation and distribution according to one embodiment of the invention.

FIG. 11 is a flow diagram illustrating GADAG computation and distribution according to one embodiment of the invention. The method 1100 may be implemented at PCE of a network in a Layer 2 or Layer 3 network, where the network contains a number of nodes.

The method may optionally start with a PCE determining a topology change of the network at reference 1102. The topology change may be due to a link outage such as outage 66 as illustrated in FIG. 10, a node down, a node addition, or any other conditions impacting topology of the network. Once the topology change is determined, the flow goes to reference 1104, where the PCE waits for completion of network convergence. The PCE may simply wait for period of time (i.e., waiting "long enough"), or it may get an indication that the network convergence has completed.

The PCE computes the generalized almost directed acyclic graph (GADAG) for the network at reference 1106. In one embodiment, bridge ID is utilized for GADAG root selection. Once the root is selected, one of the known algorithms may be utilized to determine the GADAG for the network. Then at reference 1108, the PCE assemble GADAG description for the computed GADAG.

Figure 12:
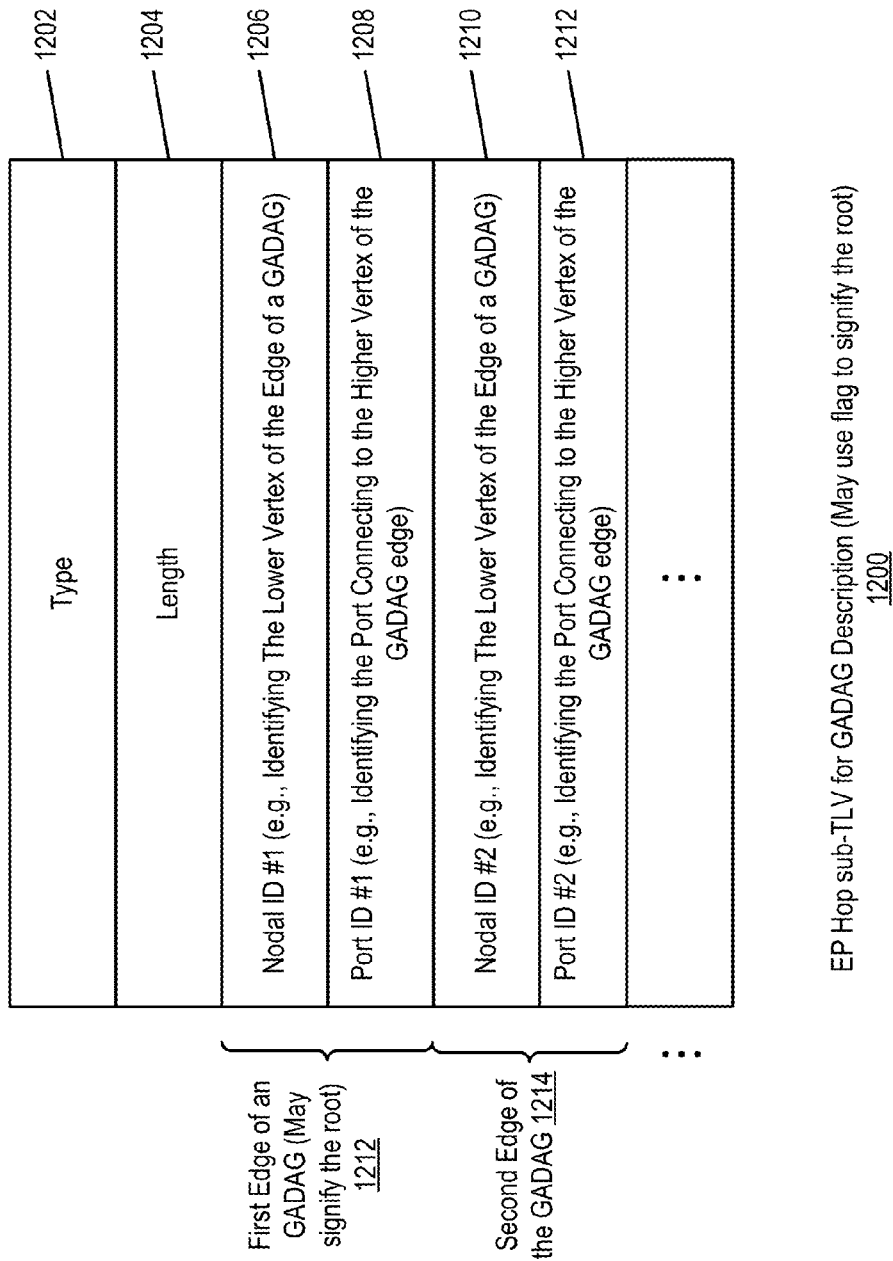
FIG. 12 illustrates an explicit path (EP) sub-TLV for distributing GADAG description according to one embodiment of the invention.

The computed GADAG may be described by a list of edges of the graph (i.e., links of the network), and an edge may be represented by a nodal identifier (ID) and a port identifier (ID). FIG. 12 illustrates an explicit path (EP) sub-TLV for distributing the GADAG description according to one embodiment of the invention. The EP sub-TLV contains a type field 1202 indicating the type of the sub-TLV, and it also contains a length field 1204 indicating the length of the sub-TLV. It also contains representation of edges of a computed GADAG. The edges of the computed GADAG are included in a list according to one embodiment. An edge can be represented by a tuple containing a nodal ID and a port ID. The nodal ID may be a system ID, an IP address, a MAC address, or a bridge ID. The port ID may be a circuit ID in Layer 3 IS-IS terminology, bridge port in Layer 2 IEEE 802.1 terminology, or any other representation of the port at the node.

Referring to FIG. 12, first edge of a GADAG at reference 1212 is represented by nodal ID #1, which identifies the lower vertex of the edge of the GADAG at reference 1206, and port ID #1, which identifies the port connecting to the higher vertex of the GADAG edge. The higher or lower vertex is according to the partial order provided by the GADAG. Similarly, the second edge of the GADAG at reference 1214 is represented by nodal ID #2 at reference 1210 and port ID #2 at reference 1212 respectively.

Note that the GADAG description may denote the GADAG root. In one embodiment, the GADAG root may be denoted by the order of the vertices, e.g., the first vertex of the EP sub-TLV for GADAG description is the GADAG root. In another embodiment, the GADAG root may be denoted by a flag. In alternative, when the GADAG description does not denote the GADAG root, each node may determine the GADAG root on its own, for example, based on the bridge IDs of the edges. An EP sub-TLV for GADAG description may be referred to as a GADAG descriptor. Note other GADAG description may be implemented without using EP sub-TLV too according to the principle of the invention.

Optionally, it might be helpful to carry along with the GADAG description in the same link state packet (LSP) a signature (i.e., a digest of the topology on which the computation was performed). Thus, each node computing the topology digest could validate whether or not the GADAG is relevant. If the digests mismatch, then the PCE has a different view on the network topology than that of the network node, and the GADAG carried in the GADAG description should be just stored but no further action is taken by the network node until digests match. The computation and the TLV for the digest have been standardized, for example, in the subclause 28.12.3 of IEEE Standard for Local and Metropolitan Area Network, dated Jun. 29, 2012, entitled "Media Access Control Bridges and Virtual Bridged Local Area Networks—Amendment 20: Shortest Path Bridging," which is incorporated by reference in its entirety.

Referring back to FIG. 11, the GADAG description then is distributed to nodes in the network at reference 1110, once the GADAG description is assembled. In one embodiment, the GADAG description is flooded to the nodes in one or more LSP containing a sub-TLV such as illustrated in FIG. 12.

Note that references 1102-1104 are optional steps for method 1100. The computation of GADAG and MRT pairs in references 1106-1110 may be triggered in other scenario, e.g., a network initiation process. Also note that for method 1100 to be deployed in nodes of a network, the nodes need to agree on the ECT algorithm to be used, VID values for MRT-Blue, MRT-Red, and SPT (when applicable). That is, the process disclosed in discussion relating to FIGS. 6-7 or another process providing setup consistency among the nodes has been completed.

Figure 13:
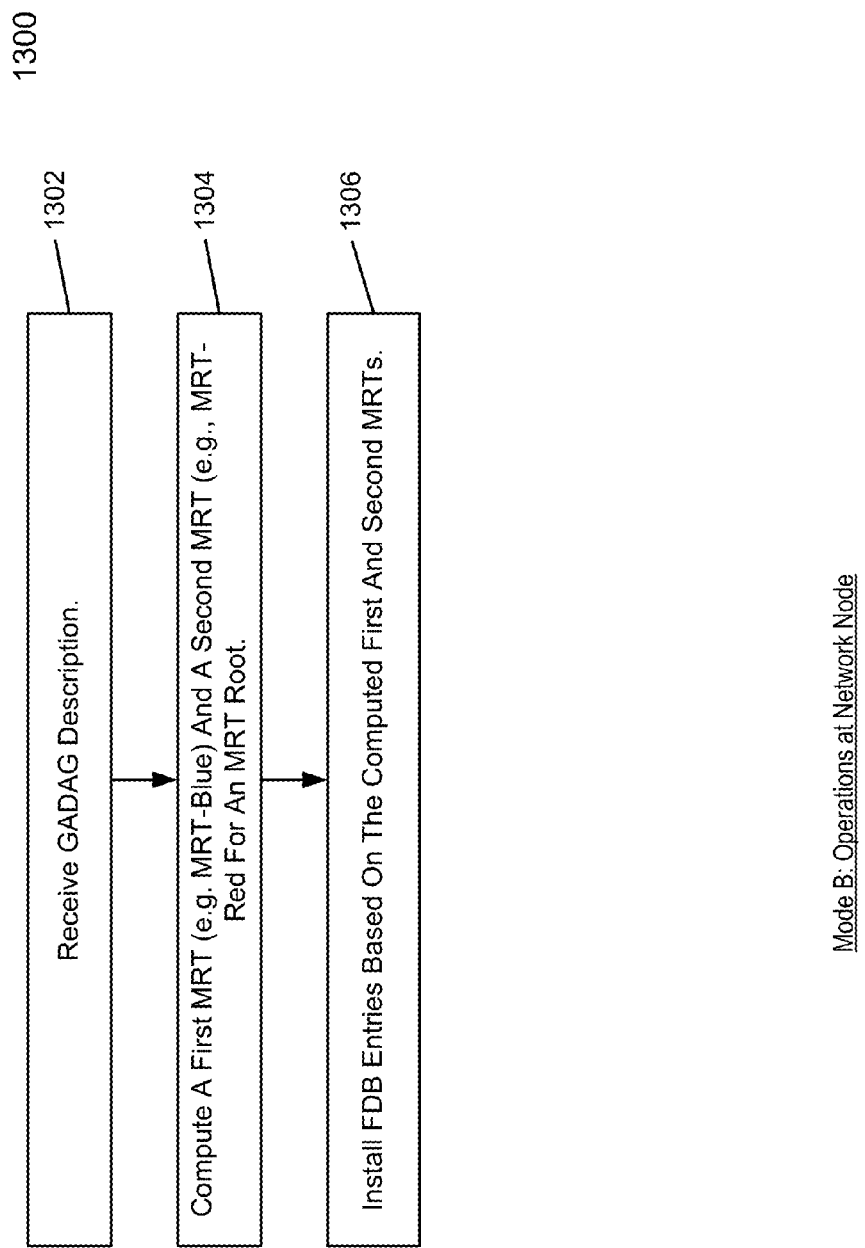
FIG. 13 is a flow diagram illustrating computing MRT pairs according to one embodiment of the invention.

After the GADAG description is distributed to the nodes in the network, the nodes then compute MRT pairs based on the GADAG description. FIG. 13 is a flow diagram illustrating computing MRT pairs according to one embodiment of the invention. The method 1300 may be implemented at nodes in a Layer 2 network.

At reference 1302, a node receives GADAG description. In one embodiment, the GADAG description is embedded in a LSP that contains an EP sub-TLV illustrated in FIG. 12. As discussed herein above, optionally the same LSP carrying the GADAG description may also carry a signature (i.e., a digest of the topology on which the computation was performed). Thus, the node computing the topology digest could validate whether or not the GADAG is relevant. If the digests mismatch, then the PCE and the network node have different view on the network topology, and the GADAG carried in the GADAG description should be just stored but no further action is taken by the network node until digests match.

Assuming the GADAG is valid, based on the GADAG description, the node computes MRT-Blue and MRT-Red for one or more MRT roots at reference 1304. In one embodiment, each node of the network is a MRT root, thus the computation of MRT pairs will be performed for each node. In another embodiment, only selected node(s) can be MRT root(s), and the node only need to compute MRT pairs for the selected node(s).

In one embodiment the selection of the MRT root(s) is encoded in the GADAG description, e.g. by having MRT Root flag set for the network nodes being MRT roots. In another embodiment one or more messages encode the MRT root selection, e.g. LSP, SNMP PDU or OpenFlow control packets. In another embodiment the MRT roots are locally configured at the network nodes, which may advertise by the network nodes, e.g. in LSPs or in LSAs.

At reference 1306, the node installs FDB entries based on the computed MRT pairs. The FDB entries may be associated with tuples of <Blue VID, MAC> and <Red VID, MAC>, which maps VIDs with particular MAC addresses. Note that an MRT tree may be "from the root" or "to the root." For example, for unicast traffic, the MRT tree typically is to the root, and for multicast traffic, the MRT tree typically is from the root, and FDB entries may be installed differently for different traffic types.

Similar to mode A, installing the FDB entries should aim to not cause traffic outage, and, at least one of the trees should be untouched while another is updated through installing the FDB entries.

Figure 14:
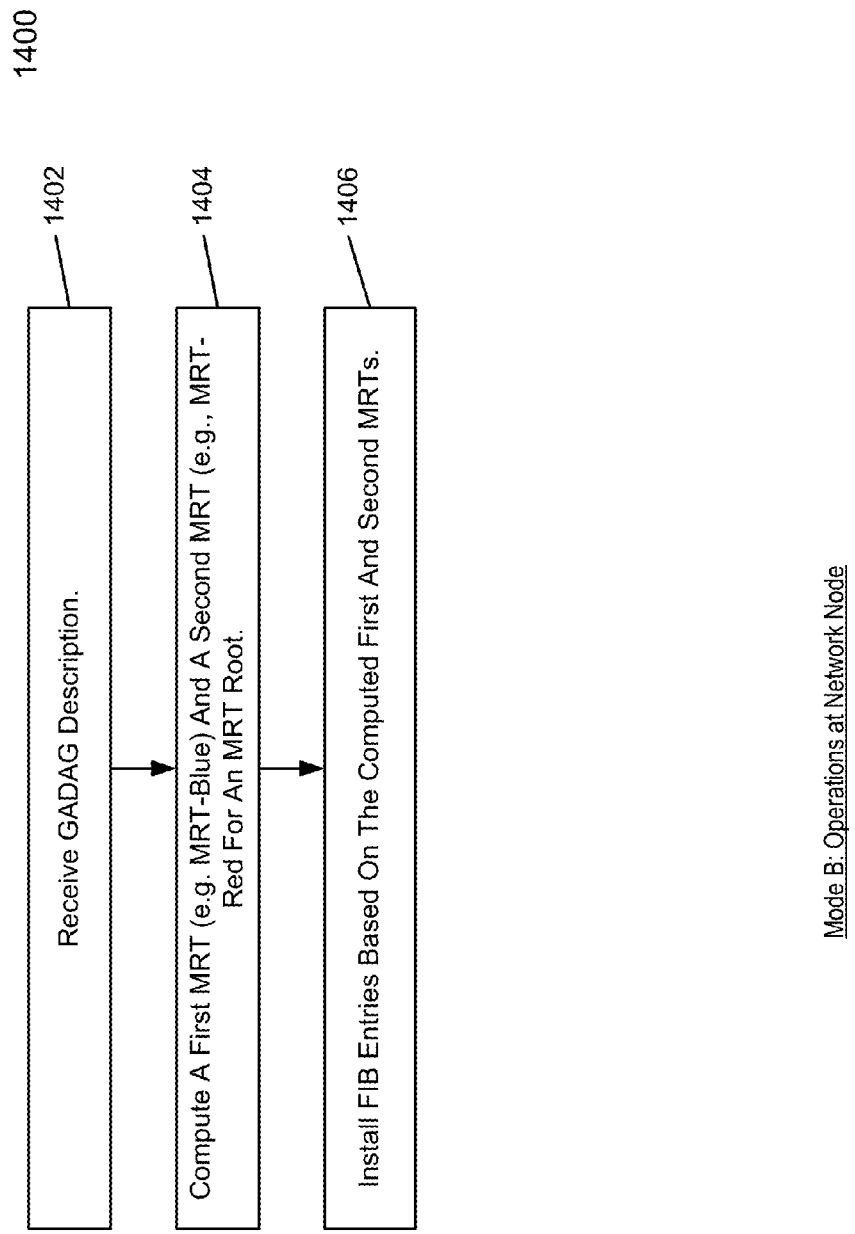
FIG. 14 is another flow diagram illustrating computing MRT pairs according to one embodiment of the invention.

While method 1300 may be implemented at nodes in a Layer 2 network, FIG. 14 illustrates computing MRT pairs according to another embodiment of the invention. Method 1400 may be implemented at nodes in a Layer 3 network. Method 1400 is similar to method 1300 except that the former is performed at Layer 3, thus at reference 1402, the received GADAG description may be in a different format optimized for Layer 3 communication. The computation of the MRT pairs for MRT root(s) at reference 1404 may be similar to reference 1304. At reference 1406, the node install forward information base (FIB) entries based on the computed MRT pairs. The FIB entries may be associated with blue and red MT IDs for each MRT root.

Embodiments in SDN or NFV

While the discussion on deploying MRTs has been on generic data networks, such as traditional networks where network elements contains an integrated control plane and data plane, embodiments of the invention are not so limited. It can be integrated well with emerging networking technologies such as software defined networking (SDN) system and network function virtualization (NFV), where control function and data forwarding function may be separated.

Figure 15:
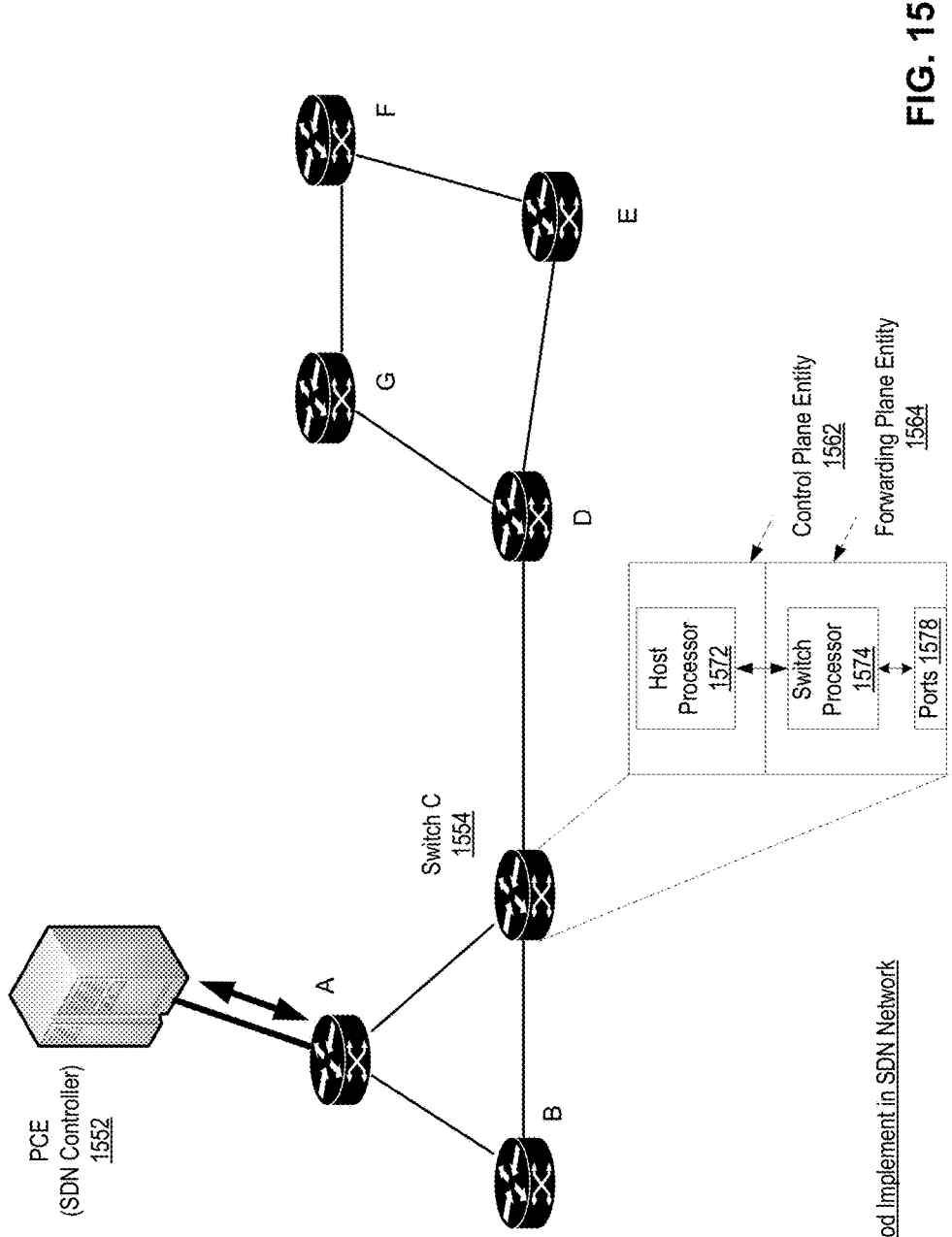
FIG. 15 is a block diagram illustrating an SDN network.

FIG. 15 is a block diagram illustrating a SDN network. SDN network 1500 comprises a number of forwarding elements and a number of controllers that instruct the forwarding elements' forwarding behavior. Note a SDN network may contain a much larger number of network elements and existing network elements may be implemented with SDN compatible protocols thus become a part of a SDN network (e.g., an existing IP router may support OpenFlow protocol and thus become a SDN forwarding element or a SDN controller). Thus SDN network 1500 is for illustrating logical SDN network configuration only.

Forwarding Elements

The main task of a SDN forwarding element (referred to as an OpenFlow switch or simply switch in OpenFlow parlance when the SDN complies with OpenFlow standards), is to forward packets within the SDN forwarding element from an ingress port to an egress port, according to the rules in flow tables programmed by one or more SDN controllers. Each flow entry contains a set of actions such as forwarding packets to a given port, modifying certain bits in a packet header, encapsulating packets to the SDN controller, or dropping the packets. For the first packet in a new flow, the forwarding element often forwards the packet to the SDN controller to trigger the new flow being programmed. It can also be used to forward slow-path packets such as Internet Control Message Protocol (ICMP) packets to the SDN controller for processing. Note that the concept of a flow can be defined broadly, e.g., a TCP connection, or all traffic from a particular MAC address or IP address. Also note that a packet within a SDN network is defined broadly and it may be an Ethernet frame, an IP network packet, or a message in a proprietary format.

SDN Controllers

A SDN controller (often referred to as a remote controller or controller) adds and removes flow-entries from a flow table. It defines the interconnection and routing among a set of SDN forward elements and other network elements. It also handles network state distribution, such as collecting information from the set of SDN forward elements and distributing forwarding/routing instructions to them. The SDN controller can also be programmed to support new addressing, routing, and complex packet processing applications. The SDN controllers are the "brains" of a SDN network. A forwarding element needs to connect to at least one SDN controller to function correctly.

Referring to FIG. 15, SDN network 1500 contains SDN controller 1592 and a set of forwarding elements (or SDN switches, the terms "forwarding element" and "SDN switch" are used interchangeably herein below) A-G. Controller 1592 (the terms "controller" and "SDN controller" are used interchangeably herein below) manages SDN switches A-G, and an SDN switch connects to its managing controller through a communication channel and the SDN switch not necessarily has a direct connectivity to a controller (thus the term "remote" controller).

An SDN switch can be viewed logically as containing two main components. One is a control plane entity and the other is a forwarding plane entity. A zoom-in view of SDN switch C at reference 1554 illustrates the two plane entities. SDN switch C contains control plane entity 1562 and forwarding plane entity 1564. Control plane entity 1562 coordinates management and configuration of SDN switch C. Configuration of forwarding plane entity 1564 is achieved by running applications on host processor 1572. Host processor 1572 usually runs an operating system in order to provide a well-known development environment. Commands from host processor 1572 are sent to the switch processor 1574 using an interconnect (e.g., a peripheral component interconnect (PCI) bus). Exception packets (e.g., packet for routing and management) are often processed on host processor 1572. Switch processor 1574 interacts with various forwarding ports 1578 of SDN switch C to forward and otherwise process incoming and outgoing packets.

Forwarding plane entity 1564 is responsible for forwarding traffic (forwarding operations includes switching, routing, learning, etc.). It contains switch processor 1574 that is designed to provide high throughput at the detriment of a more complex and flexible development environment. Different types high performance memory and hardware accelerator are often found on board of switch processor 1574 for achieving the high throughput. In contrast, host processor 1572 can be more complex and flexible at the detriment of providing high throughput as it processes more control packets (often referred to as slow path packets) than data packet thus throughput is less mission critical. When a SDN switch (e.g., SDN switch C) receives a packet associated with a new flow, it does not know where to forward the packet. Thus it sends the packet to its managing SDN controller (PCE) 1592 in this example. Controller 1592 receives the packet, and it programs a new flow entry and sends to SDN switch C. SDN switch C then forwards the packet according to the new flow entry.

A SDN network can be an ideal platform for implementing centrally computed MRT mode (mode C). In this case, PCE (SDN controller) 1552 performs both GADAG and MRT computation and distributes the computation results to all the nodes (SDN switches) in the network, so that each switch may install their respective FDB and FIB entries upon network topology change.

A SDN network can also be used for implementing centrally computed GADAG mode (mode B). In this case, PCE 1552 performs GADAG computation and distributes GADAG description (as illustrated in FIGS. 11 and 12). All the nodes computes MRT pairs and install their respective FDB and FIB entries upon network topology change (as illustrated in FIGS. 13 and 14).

Network Elements Supporting MRT Deployment

Figure 16:
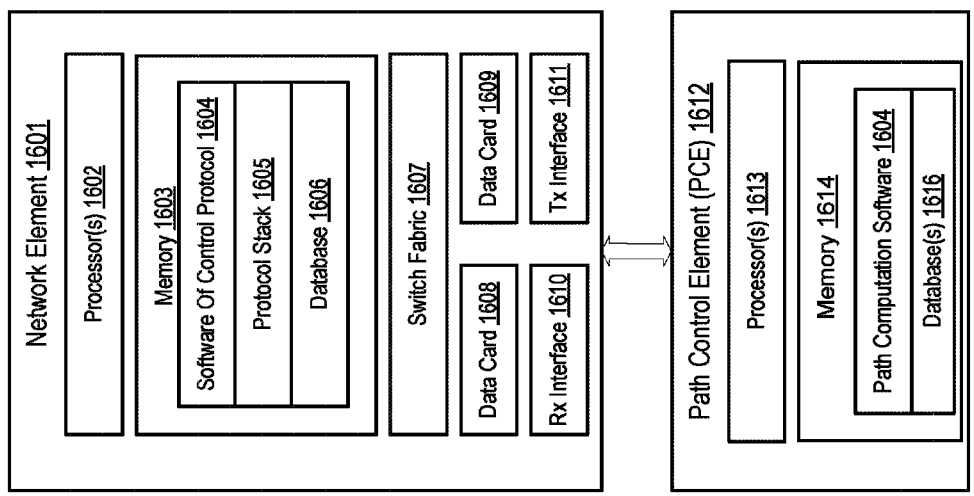
FIG. 16 is a block diagram illustrating two network elements implementing methods deploying MRTs according to one embodiment of the invention.

FIG. 16 is a block diagram illustrating two network elements implementing methods deploying MRTs according to one embodiment of the invention. The two network elements including a network element functioning as a network node and another network element functioning as a PCE. As illustrated, there is communication between the network element 1601 and the Path Control Element 1612. The network element 1601 example illustrated in FIG. 16 includes a data plane including a switching fabric 1607, a number of data cards, e.g. 1608 and 1609, at least a receiver (Rx) interface 1610 and at least a transmitter Tx interface 1611. The Rx and Tx interfaces 1610 and 1611 interface with links on the network, the data cards 1608 and 1609 perform functions on data received over the interfaces 1610 and 1611, and the switching fabric 1607 switches data between the data cards and similar input/output (I/O) cards.

The network element 1601 also includes a control plane, which includes one or more processors 1602 containing control logic configured to deploying MRTs. Other processes may be implemented in the control logic as well.

The network element 1601 also includes a memory 1603, which stores software for control protocols 1604, a protocol stack 1605, and one or more databases 1606. The software for control protocols 1604 may contain data and instructions associated with deploying MRTs. The protocol stack 1605 stores methods and/or protocols implemented by the network element 1601. The databases are used for determining and storing the forwarding path entries. For example, FDB or FIB entities may be stored in database 1606.

The network element 601 may contain other software, processes, and stores of information to enable it to perform the functions for deploying MRT and to perform other functions commonly implemented in a network element on a communication network.

The PCE 1612 coupled to a network element 1601 includes one or more processors 1613 coupled to a memory 614. The processors 613 include logic to perform path computation operations and operations for the instruction of the network element 601. The memory 1614 includes path computation software 1615 applicable for computing the GADAG and MRTs as described herein. The memory 1614 also includes databases 1616. The databases may include a replica of the databases stored by the network element 1601 and may include further databases, e.g. for GADAG and/or MRT computation.

In one embodiment, network element 1601 and PCE 1612 are parts of a Layer 2 network, and they are communicatively coupled with other network elements. Network element 1601 operates in mode A, and it may advertise and receive a network setup such as MRT VIDs sub-TLV 600 as illustrated in FIG. 6. The network elements agree to the same network setup after the setup phase. Then once the topology changes, network element 1601 performs the method discussed above relating to FIG. 9, where the computation of the shortest path, the GADAG, and MRT pairs may be performed by processor 1602 and memory 1603.

In another embodiment, network element 1601 operates in mode B. The network element, another network element, or the PCE 1612 may advertise and receive a network setup such as MRT VIDs sub-TLV 600 as illustrated in FIG. 6. The network elements agree to the same network setup after the setup phase. Once PCE 1612 determines a topology change, it performs the method discussed above relating to FIGS. 11 and 12, where the GADAG is computed and GADAG description is distributed by PCE 1612, and the computation of the GADAG may be performed by processor 1613 and memory 1614. Then network element 1601 may perform the method discussed above relating to FIGS. 13 and 14.

Figure 17:
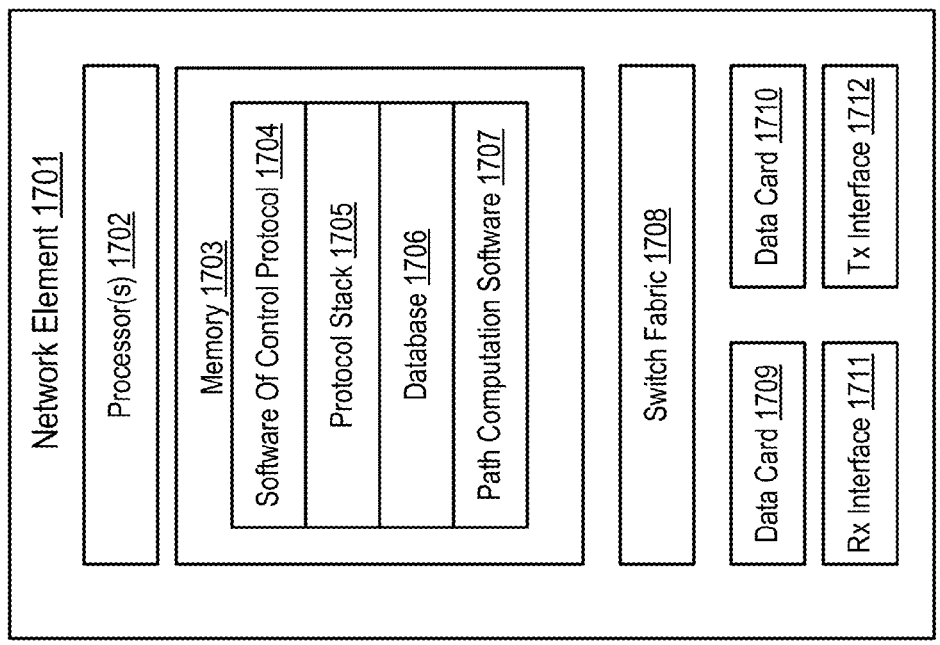
FIG. 17 is a block diagram illustrating one network element implementing methods for deploying MRTs according to one embodiment of the invention.

FIG. 17 is a block diagram illustrating one network element implementing methods deploying MRTs according to one embodiment of the invention. As FIG. 17 illustrates, the network element 1701 may host path computation software as well. Thus the network element 1701 example illustrated in FIG. 17 includes a data plane including a switching fabric 1708, a number of data cards, e.g. 1709 and 1710, at least a receiver (Rx) interface 1711 and at least a transmitter (Tx) interface 1712. The Rx and Tx interfaces 1711 and 1712 interface with links on the network, the data cards 1709 and 1710 perform functions on data received over the interfaces 1711 and 1712, and the switching fabric 1708 switches data between the data cards and/or other I/O cards. The network element 1701 also includes a control plane, which includes one or more processors 1702 containing control logic configured to deploy MRTs.

In one embodiment, network element 1701 operates in mode A, and it may advertise and receive a network setup such as MRT VIDs sub-TLV 600 as illustrated in FIG. 6. The network elements agree to the same network setup after the setup phase. Then once the topology changes, network element 1701 performs the method discussed above relating to FIG. 9, where the computation of the shortest path, the GADAG, and MRT pairs may be performed by processor 1702 and memory 1703.

Figure 18:
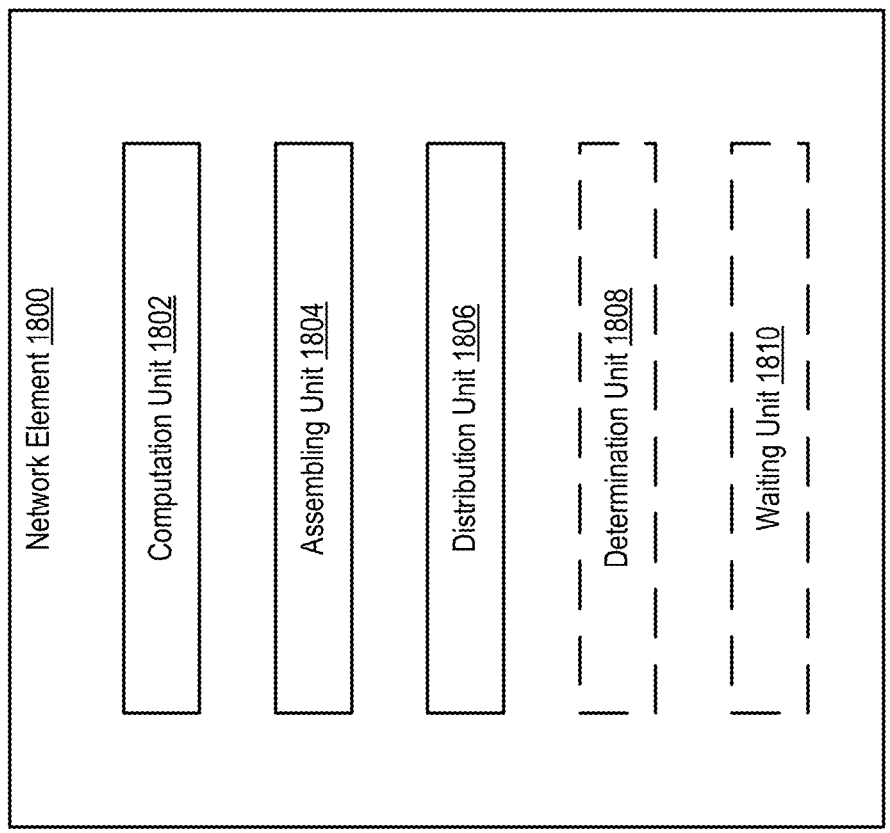
FIG. 18 is a block diagram illustrating one network element implementing methods for computing and distributing GADAG according to one embodiment of the invention.

FIG. 18 is a block diagram illustrating one network element implementing methods for computing and distributing GADAG according to one embodiment of the invention. Network element 1800 serves as a PCE of a network containing a plurality of network elements. PCE 1800 contains computation unit 1802, assembling unit 1804, and distribution unit 1806. Optionally, network element 1800 additionally contains determination unit 1808 and waiting unit 1810.

In one embodiment, computation unit 1802 computes a GADAG for the network, wherein the GADAG is a graph abstraction of the network, where the plurality of network elements are the vertices of the GADAG and links connecting the plurality of network elements are the edges of the GADAG. Assembling unit 1804 assembles a GADAG descriptor based on the computed GADAG, and distribution unit 1806 distributes the GADAG descriptor to the plurality of network elements, where each of the plurality of network elements utilizes the GADAG descriptor to compute maximally redundant trees for forwarding traffic. In one embodiment, determination unit 1808 of network element 1800 determines a topology change of the network, and waiting unit 1810 waits for completion of network convergence prior to network element 1800 causing computation unit 1802 to compute the GADAG for the network.

While the flow diagrams in the figures herein above show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method for deploying maximally redundant trees implemented in a network element implementing functionalities of a path computation element (PCE) of a network, wherein the network contains a plurality of network elements, the method comprising:
    computing, by the network element, a generalized almost directed acyclic graph (GADAG) for the network, wherein the GADAG is a graph abstraction of the network, wherein the plurality of network elements are vertices of the GADAG and links connecting the plurality of network elements are directed edges of the GADAG;
    assembling, by the network element, a GADAG descriptor describing the computed GADAG; and
    distributing, by the network element, the GADAG descriptor to the plurality of network elements, wherein each of the plurality of network elements utilizes the GADAG descriptor to compute maximally redundant trees (MRTs) for forwarding traffic.

2. The method of claim 1, wherein the computation of the GADAG includes utilizing bridge identifiers for GADAG root selection, and wherein the bridge identifiers identify the plurality of network elements and include a priority field.

3. The method of claim 1, wherein the GADAG descriptor indicates a list of the directed edges of the GADAG.

4. The method of claim 1, wherein the GADAG descriptor includes a sub-type/length/value (sub-TLV).

5. The method of claim 4, wherein the sub-TLV includes a type field, a length field, and representation of the vertices of the computed GADAG.

6. The method of claim 5, wherein each representation of the vertices contains a nodal identifier.

7. The method of claim 6, wherein the nodal identifier identifies a bridge.

8. The method of claim 6, a first represented vertex ahead of all other represented vertices denotes the first represented vertex being a GADAG root of the GADAG.

9. The method of claim 1, wherein the directed edges of the GADAG form a directed chain, and wherein the directed chain is described by an ordered list of nodal identifiers.

10. The method of claim 1, wherein the distribution of the GADAG descriptor includes flooding the GADAG descriptor contained in a link state packet (LSP) or a link state advertisement (LSA) to the plurality of network elements.

11. The method of claim 1, wherein the network contains a software-defined networking (SDN) system, and wherein the PCE is implemented by an SDN controller of the SDN system.

12. The method of claim 1, further comprising:
    determining a topology change of the network; and
    waiting for completion of network convergence prior to computing the GADAG for the network.

13. The method of claim 1, wherein the distribution of the GADAG descriptor causes at least one of the plurality of network elements to perform:
    receiving the GADAG descriptor from the network element implementing the functionalities of the PCE;
    computing a first MRT (MRT-Blue) and a second MRT for a MRT root, wherein the MRT root represents one network element of the network; and
    installing filtering database (FDB) entries based on the computed first MRT and the second MRT.

14. The method of claim 13, wherein the installation of the FDB entries comprises:

installing the FDB entries corresponding to the second MRT when the installation of FDB entries for the first MRT has been completed throughout the network.

15. The method of claim 13, wherein the GADAG descriptor is carried in a link state packet (LSP), and wherein the LSP contains a digest of topology of the network for validating the GADAG descriptor.

16. The method of claim 13, wherein the MRT root is indicated in the received GADAG descriptor.

17. The method of claim 1, wherein the distribution of the GADAG descriptor causes at least one of the plurality of network elements to perform:
receiving the GADAG descriptor from the network element implementing the functionalities of the PCE;
computing a first MRT (MRT-Blue) and a second MRT (MRT-Red) for a MRT root, wherein the MRT root represents one network element of the network; and
installing forward information base (FIB) entries based on the computed first MRT and the second MRT.

18. A network element for deploying maximally redundant trees implementing functionalities of a path computation element (PCE) of a network, wherein the network contains a plurality of network elements, the network element comprising:
a processor and memory coupled to the processor, the memory containing path computation software executable by the processor, wherein the network element is operative to:
compute a generalized almost directed acyclic graph (GADAG) for the network, wherein the GADAG is a graph abstraction of the network, wherein the plurality of network elements are vertices of the GADAG and links connecting the plurality of network elements are directed edges of the GADAG;
assemble a GADAG descriptor describing the computed GADAG; and
distribute the GADAG descriptor to the plurality of network elements, wherein each of the plurality of network elements utilizes the GADAG descriptor to compute maximally redundant trees (MRTs) for forwarding traffic.

19. The network element of claim 18, wherein the directed edges of the GADAG form a directed chain, and wherein the directed chain is described by an ordered list of nodal identifier.

20. The network element of claim 18, wherein the GADAG descriptor includes a sub-type/length/value (sub-TLV).

21. The network element of claim 18, wherein the network contains a software-defined networking (SDN) system, and wherein the network element is an SDN controller of the SDN system.

22. The network element of claim 18, wherein the network element is further operative to:
determine a topology change of the network, and
wait for completion of network convergence prior to computing the GADAG for the network.

* * * * *

UNITED STATES PATENT AND TRADEMARK OFFICE
CERTIFICATE OF CORRECTION

Page 1 of 2

PATENT NO.       : 9,614,726 B2
APPLICATION NO.  : 14/601225
DATED            : April 4, 2017
INVENTOR(S)      : Farkas et al.

It is certified that error appears in the above-identified patent and that said Letters Patent is hereby corrected as shown below:

On the Title Page

In Item (56), under "U.S. PATENT DOCUMENTS", in Column 2, Line 3, delete "Atlas" and insert -- Atlas et al. --, therefor.

On Page 2, in Item (56), under "U.S. PATENT DOCUMENTS", in Column 1, Line 2, delete "Atlas" and insert -- Atlas et al. --, therefor.

On Page 2, in Item (56), under "U.S. PATENT DOCUMENTS", in Column 1, Line 3, delete "Kulkarni" and insert -- Kulkarni et al. --, therefor.

On Page 2, in Item (56), under "U.S. PATENT DOCUMENTS", in Column 1, Line 5, delete "Yin" and insert -- Yin et al. --, therefor.

On Page 2, in Item (56), under "OTHER PUBLICATIONS", in Column 2, Line 30, delete "Diffsery" and insert -- Diffserv --, therefor.

In the Drawings

In Fig. 12, Sheet 12 of 18, delete "EP Hop" and insert -- EP --, therefor.

In Fig. 13, Sheet 13 of 18, in Step "1304", in Line 2, delete "Red" and insert -- Red) --, therefor.

In Fig. 14, Sheet 14 of 18, in Step "1404", in Line 2, delete "Red" and insert -- Red) --, therefor.

In Fig. 16, Sheet 16 of 18, delete "Software 1604" and insert -- Software 1615 --, therefor.

Signed and Sealed this
First Day of August, 2017

Joseph Matal
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 9,614,726 B2

In the Specification

In Column 7, Line 48, delete "services" and insert -- services code point --, therefor.

In the Claims

In Column 20, Line 61, in Claim 13, delete "second MRT" and insert -- second MRT (MRT-Red) --, therefor.